United States Patent [19]

Ikeda

[11] Patent Number: 5,471,464
[45] Date of Patent: Nov. 28, 1995

[54] ORTHOGONAL FREQUENCY DIVISION MULTIPLEX DEMODULATION APPAARATUS

[75] Inventor: Yasunari Ikeda, Kanagawa, Japan

[73] Assignee: Sony Corporation, Tokyo, Japan

[21] Appl. No.: 281,255

[22] Filed: Jul. 26, 1994

[30] Foreign Application Priority Data

Jul. 26, 1993 [JP] Japan ................................. 5-184251

[51] Int. Cl.$^6$ .............................. H04J 1/00; H04J 11/00
[52] U.S. Cl. .......................... 370/19; 370/23; 370/123; 370/105.3; 375/324; 375/364; 375/371
[58] Field of Search .................................. 370/19, 11, 12, 370/20, 21, 23, 69.1, 121, 100.1, 123, 105.3, 106, 108; 375/7, 8, 9, 39, 52, 80, 81, 82, 83, 94, 95, 111, 114, 110, 106, 67, 59, 371, 373, 376

[56] References Cited

U.S. PATENT DOCUMENTS

| | | | |
|---|---|---|---|
| 4,682,117 | 7/1987 | Gibson | 375/80 |
| 5,103,465 | 4/1992 | Crisler et al. | 375/110 |
| 5,309,113 | 5/1994 | Mimura et al. | 375/80 |
| 5,317,602 | 5/1994 | Onoda et al. | 375/106 |
| 5,345,440 | 9/1994 | Gledhill et al. | 370/19 |

Primary Examiner—Alpus Hsu
Assistant Examiner—Ricky Ngo
Attorney, Agent, or Firm—William S. Frommer; Alvin Sinderbrand

[57] ABSTRACT

When an orthogonal frequency division multiplex (OFDM) modulated signal is demodulated by discrete Fourier transformation (DFT), DFT is performed using a time window of an accurate phase synchronized with the synchronization symbol. Therefore, first, the reproduction clock is divided to generate a basic time window signal. The results of the DFT processing on the OFDM signal are used to detect the phase deviation and the phase of the basic time window signal is adjusted based on that phase deviation. Preferably, the results of DFT are used for synchronization pull-in to generate a stable time window signal. More preferably a DFT circuit for demodulating the OFDM modulated signal and a DFT circuit for generating a time window signal are provided separately.

16 Claims, 14 Drawing Sheets

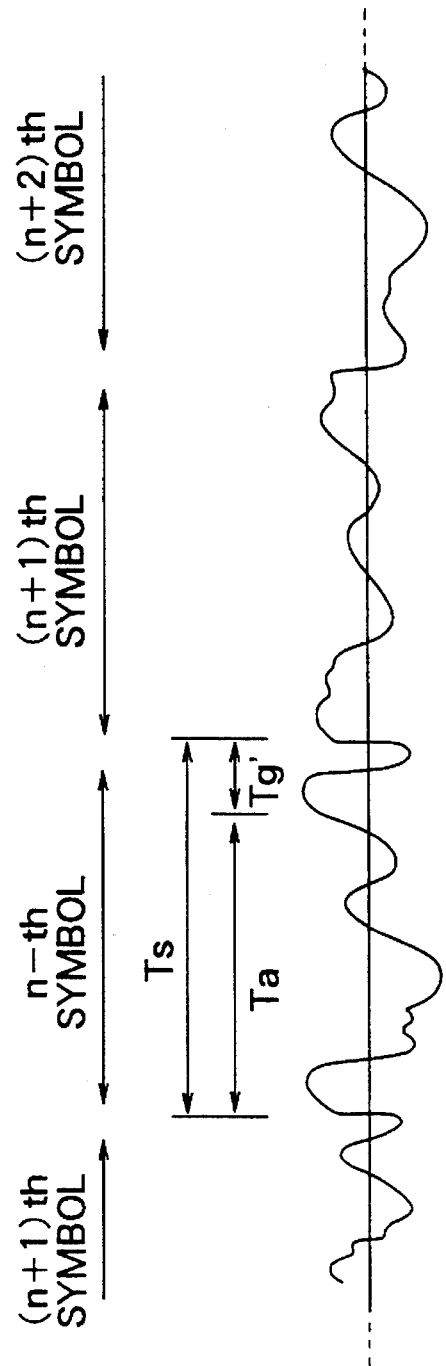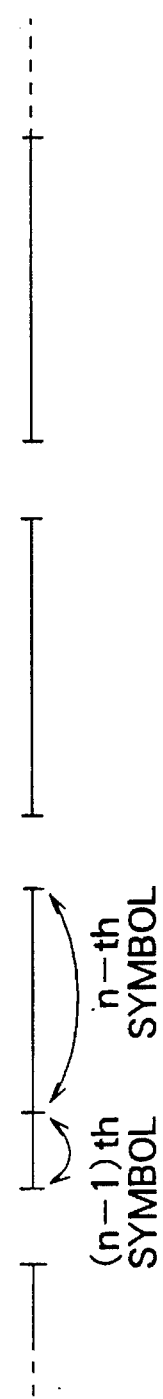
FIG. 8A
FIG. 8B
FIG. 8C

ORTHOGONAL FREQUENCY DIVISION MULTIPLEX DEMODULATION APPAARATUS

BACKGROUND OF THE INVENTION

1. Field of the Invention

The present invention relates to a digital modulation apparatus for digitally modulating a signal, more particularly to an orthogonal frequency division multiplex (OFDM) modulation apparatus for modulating an OFDM signal having 0 as the amplitude of a specific frequency component, and relates to an OFDM demodulation apparatus for demodulating this OFDM signal.

2. Description of the Related Art

When transmitting digital signals, there are known the methods of phase modulation (PM) or amplitude modulation (AM) of a single frequency carrier wave signal based on a digital signal.

As a specific example of such modulation methods, there are known phase shift keying (PSK) for changing only the phase of the carrier wave signal and quadrature amplitude modulation (QAM) for changing both the phase and the amplitude of the carrier wave signal.

In the above modulation methods, the single frequency carrier wave signal is modulated so as to have an occupied bandwidth of an extent fitting in the transmission hand.

Recently, as a new modulation method, proposal has been made of the modulation method known as the orthogonal frequency division multiplex (OFDM) modulation method.

In OFDM modulation, a plurality of orthogonal carrier wave signals are generated in the transmission band to divide the transmission band and the carrier wave signals are each subjected to PSK processing or QAM processing by digital signals.

Since OFDM modulation divides the transmission band by a plurality of carrier wave signals, the band per carrier wave signal becomes narrow and the modulation time per carrier wave signal becomes long. When the transmission band is the same, however, the overall transmission time obtained as a result of the modulation of each of the plurality of the carrier wave signals is no different from the modulation methods used widely previously, for example, the PSK and QAM methods.

In OFDM modulation, a plurality of carrier wave signals are transmitted in parallel, so the transmission rate per digital data to be transmitted, that is, symbol, becomes slower. In a transmission path with so-called multiple path interference, it is possible to reduce the relative delay time of the multiple path interference wave with respect to the time length for symbols. As a result, OFDM modulated signals are resistant to the effects of multiple path interference. Application of OFDM modulation to transmission of digital signals by earth waves taking advantage of this point is drawing great interest.

For signal processing in OFDM modulation, it is necessary to perform inverse discrete Fourier transformation (IDFT) at a high speed, while for signal processing in OFDM demodulation, it is necessary to perform discrete Fourier transformation (DFT) at a high speed.

In the past, it was difficult to realize such signal processing inexpensively and at a high speed, but recent advances in electronics technology and semiconductor technology have made possible the provision of semiconductor devices which can perform DFT and IDFT efficiently by hardware-like processing and electronic circuits using the same. Accordingly, it has become possible to perform OFDM modulation, or OFDM demodulation, using such semiconductor devices and electronic circuits.

The characterizing feature of OFDM modulation is that orthogonal carrier wave signals are generated for each predetermined bandwidth obtained by dividing a transmission channel (transmission band), but that the OFDM modulated signals are digital signals of a low data transmission rate which can fit in their respective bandwidths and that the individual carrier wave signals are not modulated by digital signals, but all carrier wave signals are modulated all at once by IDFT processing.

A summary of the OFDM modulation will be given below.

On the transmission side performing the OFDM modulation, waveforms of carrier wave signals corresponding to the values "1" or "0" of the digital data to be transmitted are defined for the plurality of carrier wave signals #1 to #n. By adding up and combining the carrier wave signals #1 to #n showing the values of the digital data to be transmitted, OFDM modulated signals are obtained. That is, if these carrier wave signals #1 to #n are arranged in order on the frequency axis and the amplitude and phase of the carrier wave signals are defined by the digital data to be transmitted, it is possible to define the waveform of the data (symbols) of the OFDM modulated signals in a predetermined time length by the digital data to be transmitted.

At the receiving side which demodulates the OFDM modulated signals, the OFDM modulated signals are received and the waveforms of the carrier wave signals are discriminated to establish correspondence with digital data, whereby it is possible to demodulate the OFDM modulated digital data sent from the transmission side for each carrier wave signal.

In OFDM modulation, it is possible to transmit the digital data by defining the carrier wave signals by two phase states and modulating them by the binary PSK (BPSK) method and also possible to define a large number of phases and amplitudes and transmit the data in multilevels.

Digital data given multiple values for each of a plurality of carrier wave signals is transmitted by defining the amplitude and phase of the carrier wave signals and obtaining the waveforms of the same. The processing operation for obtaining the waveforms is the so-called IDFT processing. Therefore, in OFDM modulation, it is possible to obtain an OFDM modulated signal using an IDFT circuit.

Conversely, the OFDM modulated signals obtained by IDFT processing in this way can be demodulated by DFT processing on the receiving side.

An explanation will be next made of the configuration and operation of the OFDM demodulation apparatus 85 for receiving and demodulating the OFDM modulated signal referring to FIG. 1.

FIG. 1 is a view of the configuration of the OFDM demodulation apparatus 85.

The OFDM demodulation apparatus 85 is comprised of an antenna 851 for receiving a radio frequency (RF) signal 850, a tuner 852, multipliers (frequency converters) 853 and 854, a local oscillator 855, a 90° phase shifter (or hybrid circuit) 856, low pass filters 857 and 858, analog to digital (A/D) converters 861 and 862, serial to parallel (S/P) converters 859 and 860, a DFT circuit 863, parallel to serial (P/S) converters 864 and 865, buffer memories 866 and 867, a carrier wave signal reproduction circuit 868, and a bit timing recovery (BTR) circuit (or clock reproduction circuit) 869 for generating a reproduction clock signal.

FIG. 2 is a graph showing the format of an OFDM modulated signal.

The RF input signal 850 input to the receiving antenna 851 is an OFDM modulated signal. In the RF input signal 850 is inserted a synchronization symbol as shown in FIG. 2.

The synchronization symbol is inserted at a predetermined position in the format of the OFDM modulated signal, for example, at the header of the format. To distinguish it from other valid symbols, it is a symbol comprised of a "null signal" of no signal meaning. This synchronization symbol is used for frame synchronization in the stage of OFDM demodulation and for reproduction of the clock signals.

The synchronization symbol can be easily inserted by making a fixed value the portion corresponding to the synchronization symbol in the original input signal of the transmission apparatus, for example, in the case of a binary signal, the I-phase (I) channel signal and the quadrature (Q) channel signal.

As a result of demodulation of the RF signal 850 in the OFDM demodulation apparatus 85, the digital I channel signal 871 and Q channel signal 872 are output from the buffer memories 866 and 867. Preferably, the buffer memories 866 and 867 remove the guard intervals from the I channel signal 871 and the Q channel signal 872.

An explanation will next be made of the operation of the OFDM demodulation apparatus 85.

The RF signal input 850 having the synchronization symbol inserted in it is captured by the receiving antenna 851 and applied to the tuner 852.

The tuner 852 converts the received RF input signal 85 in frequency to an intermediate frequency band (IF) signal, amplifies it, and applies it to the multipliers (frequency converters) 853 and 854.

The respective multipliers 853 and 854 receive as input a local oscillation frequency signal of the local oscillator 855 and a 90° phase shifted local oscillation frequency signal obtained by shifting the output signal of the local oscillator 855 90° in phase by the 90° phase shifter 856. These frequency signals and the output signal of the tuner 852 are multiplied, the IF signal output from the tuner 852 is converted in frequency to a base band signal, and the I channel signal and Q channel signal with the 90° phase difference (orthogonal relationship) are separated from it.

These two base band signals with the 90° phase difference, that is, the I channel base band signal and the Q channel base band signal, are cleared of their high frequency components by the low pass filters 857 and 858 and applied to the A/D converters 859 and 860.

The low frequency base band signals output from the low pass filters 857 and 858 are converted to digital signals in the A/D converters 859 and 860 and are further converted to parallel signals by the S/P converters 861 and 862 and then are applied to the DFT circuit 863.

The two signals converted to digital parallel signals are selected in the DFT circuit 863 based on the DFT time window signal applied from the BTR circuit 864 and DFT processing is performed on the selected portions.

The DFT time window signal is, as mentioned later, produced by dividing to 1/M the clock signal reproduced in the BTR circuit 864.

The results of the DFT processing on the two orthogonally related I and Q signals in the DFT circuit 863 are converted related I and Q signals in the P/S converters 864 and 865 output to the buffer memories 866 and 867 and the carrier wave signal reproduction circuit 868.

The carrier wave signal reproduction circuit 868 reproduces the carrier wave signals based on the two input DFT signals and using these reproduced carrier wave signals controls the local oscillator 855 to make local oscillation signals be generated from the local oscillator 855. More specifically, the carrier wave signal reproduction circuit 868 has a Costas loop circuit. The local oscillator 855 generates the carrier wave signals using the signals from the Costas loop circuit.

The BTR circuit 869 generates a clock signal CLK defining the timing of the processing in the DFT circuit 863 etc. based on the low frequency base band signals output from the low pass filters 857 and 858 and generates the DFT time window signal to the DFT circuit 863.

The two orthogonal signals converted to serial signals in the P/S converters 864 and 865 are processed to remove the guard intervals added at the time of the OFDM modulation and are output from the buffer memories 866 and 867 as the digital format I channel signal 871 and Q channel signal 872 with a phase difference of 90° (orthogonal).

To correctly demodulate the OFDM modulated signal received at the receiving side, it is necessary to correctly reproduce the carrier wave signals and clock signal and to correctly generate the DFT time window timing (phase) used in the DFT processing.

To enable correct generation of the DFT time window at the receiving side, the transmission is performed with the insertion of a null signal synchronization symbol at the header of the frame of the OFDM modulated signal. This synchronization symbol is detected at the receiving side, synchronization is performed by the Costas loop circuit or other phase locked loop (PLL) circuit in the carrier wave signal reproduction circuit 868, and the symbol clock is reproduced or use is made of the same as a reference signal for synchronization of the DFT time window.

Below, an explanation will be made of the configuration of the frame of the OFDM modulated signal and the configuration and operation of the BTR circuit 869 referring to FIG. 2 and FIG. 3.

In this example, as shown in FIG. 2, the synchronization symbol is placed before the first symbol in the frame configuration of the OFDM modulated signal.

The BTR circuit 869 shown in FIG. 3 is comprised of a synchronization symbol detection circuit 880 and a PLL circuit 890. The synchronization symbol detection circuit 880 detects the synchronization symbol shown in FIG. 2 from the low frequency base band signals output from the low pass filters 857 and 858 shown in FIG. 1. The PLL circuit 890 generates the clock signal CLK and the DFT time window signal based on the synchronization symbol detection signal detected by the synchronization symbol detection circuit 880.

The synchronization symbol detection circuit 880 is comprised of doublers 881 and 882, amplitude comparators 883 and 884, a reference value output circuit 885, an AND circuit 886, and a pulse cancel circuit 887 having a mono-multi vibrator.

The output signals of the low pass filters 857 and 858 are applied to the doublers 881 and 882 of the synchronization symbol detection circuit 880. The square values of the amplitude voltages of the input signals, that is, the instantaneous energies of the I and Q signals, are calculated at the doublers 881 and 882 and these instantaneous energies are applied to the amplitude comparison circuits 883 and 884.

In the amplitude comparison circuits 883 and 884, these square values are compared with the reference value REF output from the reference value output circuit 885. When a square value is lower than the reference value REF, it is considered that the synchronization symbol is detected and the logical value 1 is output. That is, in the period of existence of the synchronization symbol, the output signals of the low pass filters 857 and 858 become the null signal (0 V), so the logical value 1 is output from both the amplitude comparators 883 and 884.

The logical AND of the output signals of the amplitude comparison circuits 883 and 884 is taken at the AND circuit 886. When the synchronization symbol is detected, the output signal of the AND circuit 886 becomes the logical value 1. The result of the AND operation is applied to the pulse cancel circuit 887.

Even in the period of data from the first symbol to the (N–1)th symbol shown in FIG. 2, there are sometimes cases due to the effects of noise, the effects of multiple path interference, etc. where the output value of the AND circuit 886 becomes the logical value 1 for an instant as if the synchronization symbol were present.

The pulse cancel circuit 887 accurately detects the synchronization symbol by canceling the pulses generated when the output signal of the AND circuit 886 becomes the logical value 1 for an instant at periods other than that of the synchronization symbol and outputs the result to the PLL circuit 890 as the synchronization symbol detection signal. The pulse cancel circuit 887 is comprised of a circuit comprised of a combination of a low pass filter and a waveshaping circuit for example.

The PLL circuit 890 is comprised of a phase comparator 891, a low pass filter 892, a voltage controlled oscillator (VCO) 893, a 1/M frequency divider 894, and a 1/N frequency divider 895.

The VCO 893 generates a clock signal CK, the 1/M frequency divider divides the clock signal CK to 1/M to generate the time window signal, and the 1/N frequency divider 895 generates a timing pulse for detecting the synchronization symbol. Details of this operation are explained below.

The synchronization symbol detection signal output from the synchronization symbol detection circuit 880 is input to the phase comparator 891, where it is compared in phase with the signal output from the 1/N frequency divider 895. The phase error output from the phase comparator 891 is filtered by the low pass filter 892 and applied to the VCO 893. The VCO 893 generates a clock signal CK of a frequency corresponding to the output signal voltage of the low pass filter 892. The clock signal CK is divided in frequency to the 1/M frequency by the 1/M frequency divider 894 and is output as the DFT time window signal to the DFT circuit 863 and further is divided to the 1/N frequency at the 1/N frequency divider 895 and input to the phase comparator 891.

The N defining the 1/N frequency division ratio of the 1/N frequency divide 895 matches with the number N of symbols, including the synchronization symbol, in the frame of the OFDM modulated signal shown in FIG. 2. When the frame configuration is changed, the frequency division ratio of the 1/N frequency divider 895 is changed along with it.

When the above-mentioned OFDM modulated signal is transmitted in the format of a radio wave signal, there is the possibility of multiple path interference or large noise or other external disturbances for example in the transmission path.

In a transmission path suffering from such external disturbances, the components of the symbols adjoining the synchronization symbol leak into the period of the synchronization symbol or noise ends up entering into the synchronization symbol period, so it is sometimes difficult at the receiving side to accurately detect the synchronization symbol included in the RF input signal 850.

Further, since it is not possible to transmit effective data in the period of the synchronization symbol, the request has been made, from the standpoint of the efficiency of the data transmission, that the synchronization symbol be made as small as possible.

Conversely, however, there is the problem that reduction of the period of the synchronization symbol is not desired from the standpoint of the stability of the PLL circuit 890 defining the timing of operation of the OFDM demodulation apparatus on the receiving side since the signal required for synchronization at the PLL circuit 890 becomes shorter.

SUMMARY OF THE INVENTION

The present invention was made in consideration of the above problems and has as its object the provision of an OFDM demodulation apparatus and method which accurately generates a DFT timing window signal and enables accurate demodulation of the OFDM modulated signal even when receiving an OFDM modulated signal affected by noise etc. through a transmission path suffering from much external disturbance.

Another object of the present invention is to provide an OFDM demodulation apparatus and method which simultaneously satisfy the contradictory demands of improvement of the transmission efficiency and the stability of the clock signal reproduction operation.

A still another object of the present invention is to provide an OFDM modulation apparatus and method enabling effective modulation of the OFDM modulated signal.

A yet still an other object of the present invention is to provide an OFDM modulation and demodulation system having the above-mentioned OFDM modulation apparatus and the above-mentioned OFDM demodulation apparatus.

According to the present invention, there is provided an OFDM modulation apparatus, including:

- a first IDFT means for performing IDFT on a first digital component signal to produce a first time region composition signal,
- a second IDFT means for performing IDFT on a second digital component signal in an orthogonal relationship with the first digital component signal to produce a second time region composition signal,
- a first frequency conversion means for performing frequency conversion on a first carrier wave signal by the first time region component signal to produce a first frequency converted signal,
- a second frequency conversion means for performing frequency conversion on a second carrier wave signal having the same frequency as the first carrier wave signal but in an orthogonal relationship with the same by the second time region component signal to produce a second frequency converted signal,
- a combination means for combining the first frequency converted signal and the second frequency converted signal, and a bandpass filter means for passing only a predetermined frequency band component of the results of combination in the combination means.

The first IDFT means has an IDFT coefficient which gives a result of the IDFT corresponding to the predetermined frequency component which becomes a value showing the synchronization symbol. The second IDFT means has an IDFT coefficient which gives a result of the IFDT corresponding to the predetermined frequency component which becomes a value showing the synchronization symbol.

Specifically, the value of the synchronization symbol is 0. In this case, the IDFT coefficient corresponding to the predetermined frequency component in the first IDFT means is 0 and the IDFT coefficient corresponding to the predetermined frequency component in the second IDFT means is 0.

Preferably, the first IDFT means and the second IDFT means are comprised integrally.

Preferably, the OFDM modulation apparatus is provided with a first guard interval adding means which is provided after the first IDFT means and adds a guard interval to the first time region component signal and a second guard interval adding means which is provided after the second IDFT means and adds a guard interval to the second time region component signal.

More specifically, the first guard interval adding means adds 0 as the guard interval, while the second guard interval adding means adds 0 as the guard interval.

Preferably, the OFDM modulation apparatus is further provided with a first low pass filter means provided between the first guard interval adding means and the first frequency conversion means and a second low pass filter means provided between the second guard interval adding means and the second frequency conversion means.

More specifically, the first signal component is an in-phase signal component, while the second signal component is the quadrature signal component.

According to the present invention, further, there is provided an OFDM demodulation apparatus for demodulating an OFDM signal which is comprised of a first component signal including a synchronization symbol and a second component signal including a synchronization symbol in an orthogonal relationship with the first component signal, which component signals are multiplexed by orthogonal frequency division. The OFDM demodulation apparatus includes:

a first signal extracting means for extracting a first component signal from the OFDM signal, a second signal extracting means for extracting a second component signal from the OFDM signal, a clock reproduction means for reproducing a clock signal using the first component signal and second component signal, a first DFT means for performing DFT on the extracted first component signal using a first time window signal to generate a first frequency region component signal, a second DFT means for performing DFT on the extracted second component signal using the first time window signal to generate a second frequency region component signal, and a time window synchronization signal generating means provided with a basic time window signal means for dividing in frequency the reproduced clock signal and generating a basic time window signal, a phase adjusting means for detecting the timing in which the synchronization symbol is present using the first frequency region component signal and the second frequency region component signal and adjusting the phase of the basic time window signal, and a synchronization pull-in means for performing synchronization pull-in of the basic time window signal to the phase of the synchronization symbol using the first frequency region component signal and the second frequency region component signal, the time window signal subjected to the synchronization pull-in and phase adjustment being applied to the first DFT means the second DFT means.

Preferably, the first signal extracting means detects the timing in which the synchronization symbol included in the first frequency region component signal and second frequency region component region is present and extracts the first component signal from the OFDM modulated signal based on the first carrier wave signal having the oscillation frequency defined based on the timing, and, the second signal extracting means detects the timing in which the synchronization symbol included in the first frequency region component signal and second frequency region component region is present and extracts the second component signal from the OFDM modulated signal based on the second carrier wave signal having the oscillation frequency defined based on the timing and in an orthogonal relationship with the first carrier wave signal.

Preferably, the phase adjusting means of the time window synchronization signal generating means detects the timing in which the synchronization symbol included in the first component signal and the second component signal using the combined energy of the stun of the energy component of the first frequency region component signal and the energy component of the second frequency region component signal and adjusts the phase of the basic time window signal accordingly.

Preferably, the synchronization pull-in means of the time window synchronization signal generating means performs synchronization pull-in so that the cumulative sum of the combined energy of the sum of the energy component of the first frequency region component signal and the energy component of the second frequency region component signal becomes the minimum.

Preferably, a guard interval is included in the first component signal and the second component signal. The OFDM demodulation apparatus is provided with a first guard interval removing means for removing the guard interval from the first frequency region component signal from the first DFT means, and a second guard interval removing means for removing the guard interval from the second frequency region component signal output from the second DFT means.

Preferably, the first DFT means and the second DFT means are comprised integrally.

More specifically, the first frequency region component signal is an in-phase signal component, while the second frequency region component signal is the quadrature signal component.

Further, according to the present invention, there is provided an OFDM demodulation apparatus for demodulating an OFDM signal which is comprised of a first component signal including a synchronization symbol and a second component signal including a synchronization symbol in an orthogonal relationship with the first component signal, which component signals are multiplexed by orthogonal frequency division. The OFDM demodulation apparatus includes:

a first signal extracting means for extracting a first component signal from the OFDM signal, a second signal extracting means for extracting a second component signal from the OFDM signal, a clock reproduction means for reproducing a clock signal using the first component signal and second component signal, a first DFT means for performing DFT on the extracted first component signal using a first time window signal to generate a first frequency region component signal, a second DFT means for performing DFT on the extracted second component signal using the first time window signal to generate a second frequency region component signal, a third DFT means for performing DFT on the extracted first component signal using the second time window signal to generate a third frequency region component signal, a fourth DFT means for performing DFT on the extracted second component signal using the second time window signal to generate a fourth frequency region component signal, a first time window synchronization signal generating means provided with a first basic time window signal means for dividing in frequency the reproduced clock signal and generating a first basic time window signal, a first phase adjusting means for detecting the timing in which the synchronization symbol is present using the third frequency region component signal and the fourth frequency region component signal and adjusting the phase of the first basic time window signal, and a first synchronization pull-in means for performing synchronization pull-in of the first basic time window signal to the phase of the synchronization symbol using the third frequency region component signal and the fourth frequency region component signal, the first time window signal subjected to the synchronization pull-in and phase adjustment being applied to the first DFT means and the second DFT means, and a second time window synchronization signal generating means provided with a second basic time window signal means for dividing in frequency the reproduced clock signal and generating a second basic time window signal, a second phase adjusting means for detecting the timing in which the synchronization symbol is present using the third frequency region component signal and the fourth frequency region component signal and adjusting the phase of the first basic time window signal, and a second synchronization pull-in means for performing synchronization pull-in of the second basic time window signal to the phase of the synchronization symbol using the third frequency region component signal and the fourth frequency region component signal, the second time window signal subjected to the synchronization pull-in and phase adjustment being applied to the third DFT means and the fourth DFT means.

Preferably, the first DFT means and the second DFT means are comprised integrally, and the third DFT means and the fourth DFT means are comprised integrally.

BRIEF DESCRIPTION OF THE DRAWINGS

The above objects and features of the present invention, along with other objects and features, will be more apparent from the following description made with reference to the appended drawings, in which:

FIG. 8A is a graph showing part of the frame configuration of a received OFDM modulated signal, FIG. 8B is a graph showing the case where the DFT time window signal fits in the same symbol, and FIG. 8C is a graph showing the case where the DFT time window signal fits into two symbols.

DESCRIPTION OF THE PREFERRED EMBODIMENTS

Figure 1:
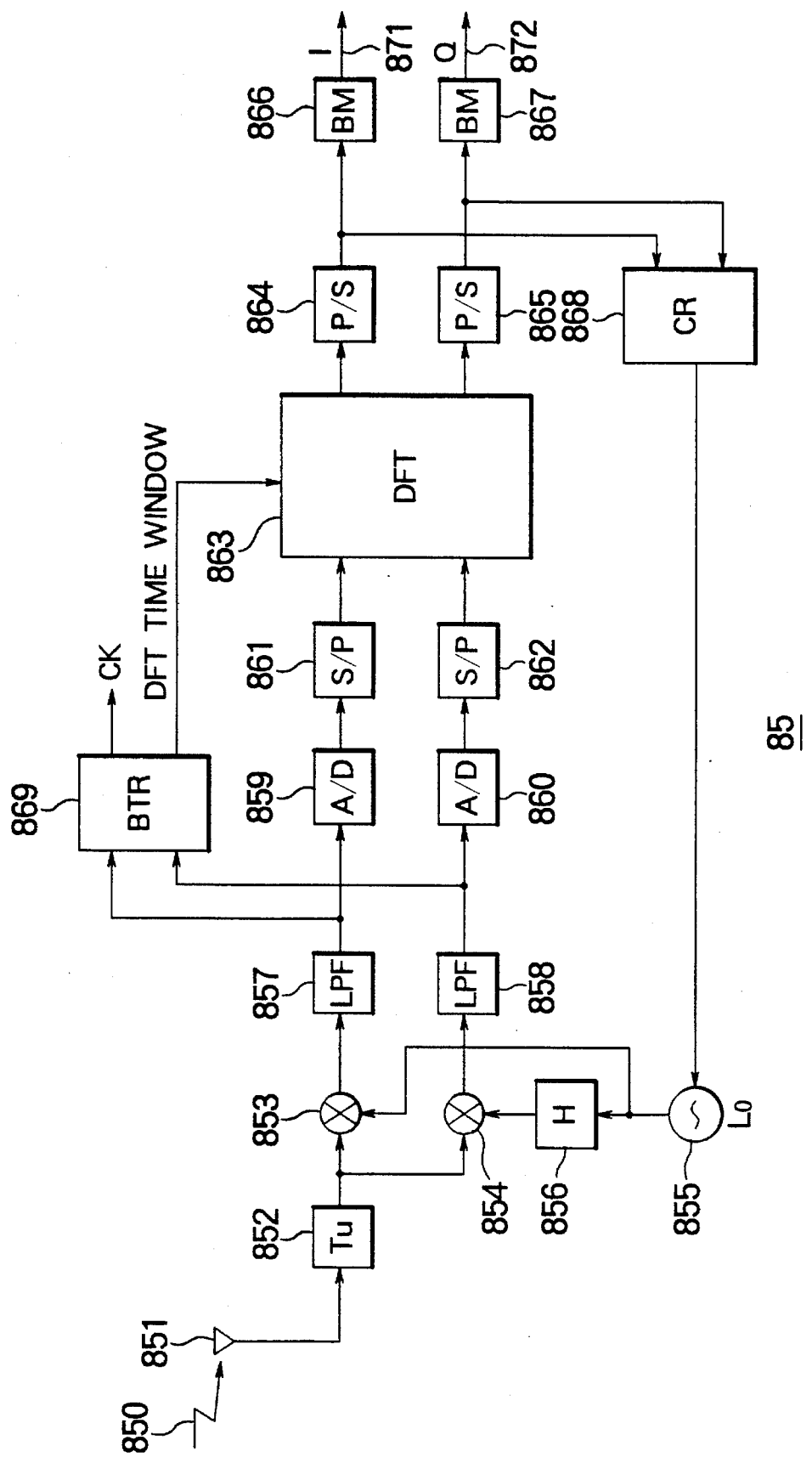
FIG. 1 is a view of the configuration of an OFDM modulation apparatus of the related art.
Figure 2:
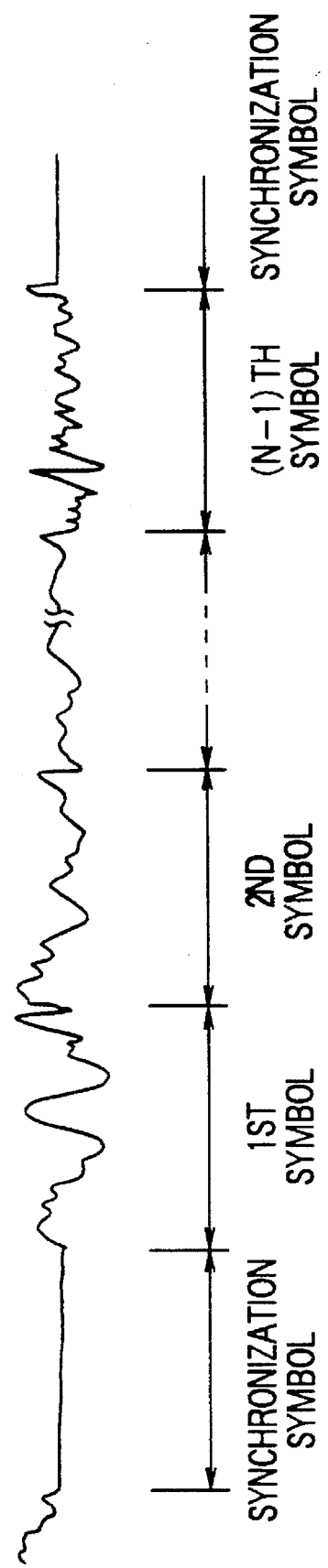
FIG. 2 is a view illustrating the frame configuration of an OFDM modulated signal.

Before explaining the preferred embodiments of the OFDM demodulation apparatus of the present invention, an explanation will be given of the basic principle of OFDM modulation in the present invention using numerical equations.

In a 64 QAM or other general multi-level modulation system, a single carrier wave signal is modulated in amplitude or modulated in phase to transmit data in a predetermined band, but the OFDM modulation of the present invention performs transmission of digital data in a predetermined frequency band by modulating a plurality of carrier wave signals by a bit rate lower than the modulation methods using a single carrier wave signal.

If the number of carrier wave signals (number of symbols) of the OFDM modulated signals is made N and QAM modulation is performed on a plurality of carrier wave signals, the m-th symbol $f_m(t)$ of the OFDM signal is expressed by the following equation 1:

$$f_m(t) = S_{T'}(t - nT') \sum_{n=0}^{N-1} a_{mn} \exp(n\omega_o t + \phi_{mn} + \Delta\phi_{mn}) \quad (1)$$

where, $S_{T'}$, =1, when $|t| \leq T'/2$
0, when $|t| > T'/2$
$T' = T + T_g$
$\omega_o = 2\pi/T$ T is width of time window in Fourier transformation $T_g$ is guard interval $a_{mn}$ is amplitude of n-th carrier wave signal of m-th symbol $\phi_{mn}$ is phase of n-th carrier wave signal of m-th symbol In equation 1, $\Delta\phi_{m,n}$ is the term for correcting the phase rotation of the symbol by the guard interval, mentioned later, and is expressed by the following equation 2:

$$\phi_{mn} = 2\pi mn \, T_g/T \quad (2)$$

From equation 1 and equation 2, the OFDM signal is expressed by the following equation 3:

$$f(t) = \sum_{m=-\infty}^{+\infty} f_m(t) = \quad (3)$$

$$\sum_{m=-\infty}^{\infty} \sum_{n=0}^{N-1} a_{mn} \exp j(n\omega_o t + \phi_{mn} + \Delta\phi_{mn}) \cdot S_{T'}(t - mT')$$

Below, the power spectrum of the OFDM modulated signals will formularized.

The Fourier integral of the m-th symbol $f_m(t)$ of the time width T' of the m-th symbol expressed by equation 1 is expressed as follows:

$$F_m(\omega) = \int_{(m-1/2)T'}^{(m+1/2)T'} f_m(t) e^{-j\omega t} dt \quad (4)$$

$$= T' \sum_{n=0}^{N-1} a_{mn} \frac{\sin T'(n\omega_o - \omega)/2}{T'(n\omega_o - \omega)/2} \cdot$$

$$\exp j[(n\omega_o - \omega)mT' + \phi_{mn} + \Delta\phi_{mn}]$$

From equation 4, the energy spectrum in the integral duration is expressed by the following equation:

$$|F_m(\omega)|^2 = F_m(\omega) F_m^*(\omega) \quad (5)$$

$$= T'^2 \left( \sum_{n=0}^{N-1} a_{mn}^2 \left\{ \frac{\sin T'(n\omega_0 - \omega)/2}{T'(n\omega_0 - \omega)/2} \right\}^2 + \right.$$

$$\sum_{n=0}^{N-1} \sum_{\substack{k=0 \\ k \neq m}}^{N-1} a_{mn} a_{mk} \frac{\sin T'(n\omega_o - \omega)/2 \cdot \sin T'(k\omega_o - \omega)/2}{T'(n\omega_o - \omega)/2 \cdot T'(k\omega_o - \omega)/2} \cdot$$

$$\left. \exp(j(n-k)\omega_o mT') \right)$$

The content of the second term in equation 5 is as follows:

$$\sum_n \sum_{K \neq m} a_{mn} \exp(jn\omega_o mT') \cdot a_{mk} \exp(-jk\omega_o mT') \quad (6)$$

It is a correlation function of the modulation waves of the m-th and k-th carrier wave signals. If it is assumed there is no correlation between data, then the value of equation 6 becomes 0. Accordingly, equation 3 may be modified as shown by the following equation:

$$|F(\omega)|^2 = \sum_{m=-\infty}^{+\infty} \sum_{n=0}^{N-1} a_{mn}^2 \left( \frac{\sin T'(n\omega_o - \omega)/2}{T'(n\omega_o - \omega)/2} \right)^2 \quad (7)$$

$$= \sum_{m=-\infty}^{+\infty} \sum_{n=0}^{N-1} \left( \frac{\sin \frac{T+T_k}{2} \left( \frac{2n\pi}{T} - \omega \right)}{\frac{T+T_k}{2} \left( \frac{2mn}{T} - \omega \right)} \right)^2.$$

At the receiving side, the received OFDM modulated signal is subjected to DFT to demodulate it. At this time, the OFDM modulated signal is selected by the DFT time window and then DFT processing is performed.

The relationship between the timing of the DFT time window and the demodulated output will be explained next.

For simplification of the explanation, the explanation will be made of the case where m=0 in the above equations. Equation 1 becomes as in the following equation:

$$f_0(t) = S_{T'}(t) \sum_{n=0}^{N-1} a_{0n} \exp(j(n\omega_0 t + \phi_{0n})) \quad (8)$$

The explanation will be made of the case where there is no guard interval, i.e., the case where T=T'.

If the DFT time window is shifted in time (or deviated in phase) by exactly $\tau_0$, there are two symbols of m=0,−1 present in the integral duration [−T/2, t/2]. This Fourier integral $F_0$ (ω) is expressed by the following equation:

$$F_0'(\omega) = \int_{-T/2}^{T/2} [f_0(t - \tau_0) + f_{-1}(t - \tau_0)] \cdot \exp(-j\omega t) dt \quad (9)$$

The second term in equation 9 is the interference component leaking from the adjoining symbols due to deviation of the DFT time window by $\tau_0$.

It the coefficient $F_{0K}'$ with respect to the DFT for (2×N) points is sought from equation 9, the following equation results:

$$F_{0k}' = (1 - \tau_0/T) \exp(-j2\pi\tau_0/T) \cdot \left[ a_{0k} \exp(j\phi_{0k}) + \right. \quad (10)$$

$$\sum_{n=k} a_{0n} \frac{\sin(n-k)(1-\tau_0/T)\pi}{(n-k)(1-\tau_0/T)\pi} \exp j\{\phi_{0n} - (n-k)\pi\tau_0/T\} +$$

$$\frac{\tau_0}{T - \tau_0} \sum_{n=0}^{N-1} a_{-1n} \frac{\sin(n\omega_0 - \omega)\tau_0/2}{(n\omega_0 - \omega)\tau_0/2}.$$

$$\exp j\{\phi_{-1n} - (n\omega_0 - \omega)(T + \tau_0)/2\} \Bigg] \quad (10)$$

The first term in the parentheses in equation 10 shows the signal component, the second term the leakage signal component from the other carrier wave signals, and the third term the leakage signal component from the adjoining symbols. Further, the coefficient shows the overall changes in amplitude and phase.

The ratio of the interference power $I_k$ due to the leakage signal component with respect to the signal power $S_k$ in the k-th carrier wave signal is expressed by the following equation:

$$S_K/I_k = 1 / \left( \sum_{n \neq k} \left\{ \frac{\sin(n-k)(1 - \tau_0/T)\pi}{(n-k)(1 - \tau_0/T)\pi} \right\}^2 + \left( \frac{\tau_0}{T - \tau_0} \right)^2 \sum_{n=0}^{N-1} \left\{ \frac{\sin(n-k)\pi\tau_0/T}{(n-k)\pi\tau_0/T} \right\}^2 \right) \quad (11)$$

An explanation will be made of the case of presence of a guard interval.

The Fourier integral $F_0'''(\omega)$ in the case of a small phase deviation $\tau_0$ of the DFT time window and an integral duration in the same symbol ($\tau_0 \leq T_g/2$) is expressed by the following equation:

$$F_0''(\omega) = \int_{-T/2}^{T/2} f_0(t - \tau_0) \exp(-j\omega t) dt \quad (12)$$

$$= T \sum_{n=0}^{N-1} a_{0n} \frac{\sin(n\omega_0 - \omega)T/2}{(n\omega_0 - \omega)T/2} \exp(j(\phi_{0n} - n\omega_0\tau_0))$$

If the DFT coefficient $F_{OK}'''$ is sought from equation 12, the following equation is obtained:

$$F_{Ok}'' = a_{0k} \exp(j(\phi_{0k} - k\omega_0\tau_0)) \quad (13)$$

There is only a signal component in equation 13. Accordingly, it is learned from equation 13 that the signal phase is rotated by the carrier wave signal.

Next, an explanation will be made of the case where the phase deviation $\tau_0$ of the DFT time window is larger and the integral duration involves the adjoining symbols.

In this case, the result becomes similar to the model of the case with no guard interval, so the Fourier integral, DFT, and ratio $S_k/I_k$ of the interference power $I_k$ to the signal power $S_k$ become the same as in equations 9 to 11, respectively.

An explanation will now be made of the case of allocation of the null signal as the guard interval.

If the null signal duration of the guard interval is sufficiently long compared with the deviation $\tau_0$ of the time window, the Fourier integral $F_0''(\omega)$ is expressed by the following equation:

$$F_0'''(\omega) = \int_{-T/2}^{T/2} f_0(t - \tau_0) \exp(-j\omega t) dt \quad (14)$$

$$= (T - \tau_0) \exp(-j\omega\tau_0/2) \cdot$$

$$\sum_{n=0}^{N-1} a_{0n} \frac{\sin(n\omega_0 - \omega)(T - \tau_0)/2}{(n\omega_0 - \omega)(T - \tau_0)/2} \exp(j(\phi_m - n\omega_0\tau_0/2))$$

Equation 14 becomes just the first term of equation 8. The reason is that the time deviation $\tau_0$ of the DFT time window becomes the integral of the null signal duration, so becomes 0 and because there is no longer leakage of the signal component from the adjoining symbols caused in the case of no guard interval. If the coefficient $F_{Ok}''$ in the case of performing DFT on 2N points is sought from equation 14, the following equation results:

$$F_{Ok}'''(\omega) = (1 - \tau_0/T) \exp(-j2\pi k\tau_0/T) [a_{0k} \exp(j\phi_0 k) + \quad (15)$$

$$\sum_{n \neq k} a_{0n} \frac{\sin(n-k)(1 - \tau_0/T)\pi}{(n-k)(1 - \tau_0/T)\pi} \cdot \exp(j\{\phi_{0n} - (n-k)\pi\tau_0/T\}]$$

The first term in the parentheses in equation 15 is the signal component, while the second term shows the leakage signal component from the other carrier wave signals. The signal power to interference power ratio $S_k/I_k$ is expressed by the following equation:

$$S_k/I_k = 1 / \sum_{n \neq k} \left( \frac{\sin(n-k)(1 - \tau_0/T)\pi}{(n-k)(1 - \tau_0/T)\pi} \right)^2 \quad (16)$$

An explanation will be made next of the effect of ghosts caused by multiple path interference etc.

A signal as the ghost $g_0(t)$ is assumed that the main signal expressed by the following equation is delayed by the deviation $\tau_0$ of the time window, a ghost level is $\alpha_0$ and a phase thereof is rotated by exactly $\theta_0$.

$$g_0(t) = \alpha_0 f_0(t - \tau_0) \exp(j\theta_0) \quad (17)$$

In equation 17, the component of $\exp(j\theta_0)$ is assumed because of consideration of the leakage of the I axis and Q axis, that is, the orthogonal ghost.

Further, the main signal $F_{Ok}$ is expressed by the following equation:

$$F_{Ok} = a_{0k} \exp(j\phi_{0k}) \quad (18)$$

When allocating a null signal as the guard interval, the DFT coefficient $G_{Ok}$ of the ghost component is expressed by the following equation referring to equation 15:

$$G_{0k} = \alpha_0 (1 - \tau_0/T) \exp(j(\theta_0 - 2\pi k\tau_0/T)) \Bigg[ a_{0k} \exp(j\phi_{0k}) + \quad (19)$$

$$\sum_{n \neq k} a_{0k} \frac{\sin(n-k)(1 - \tau_0/T)\pi}{(n-k)(1 - \tau_0/T)\pi} \exp(j(\phi_{0k} - (n-k)\pi\tau_0/T) \Bigg]$$

Accordingly, the DFT coefficient $H_{Ok}$ of the received signal comprised of the main signal plus the ghost is expressed by the following equation:

$$H_{Ok} = F_{Ok} + G_{Ok} \quad (20)$$

-continued
$$= \{1 + 2\alpha_0(1 - \tau_0/T)\cos(\theta_0 - 2\pi k\tau_0/T) +$$
$$\alpha_0^2(1 - \tau_0/T)^2\}^{1/2}\exp(j\theta)a_{0k}\exp(j\phi_{0k}) +$$
$$\alpha_0(1 - \tau_0/T)\exp(j(\theta_0 - \pi k\tau_0/T))$$
$$\sum_{n \neq k} a_{0k} \frac{\sin(\theta_0 - 2\pi k\tau_0/T)\pi}{(n-k)(1 - \tau_0/T)\pi} \exp(j(\phi_{0n} - n\pi\tau_0/T))$$

In equation 20, the first term is the signal component and the second term is the leakage signal component from the other carrier wave signals. Accordingly, the ratio of the signal power to the interference power $S_k/I_k$ is expressed by the following equation:

$$S_k/I_k = [1 + 2\alpha_0(1 - \tau_0/T)\cos(\theta_0 - 2\pi k\tau_0/T) + \quad (21)$$
$$\alpha_0^2(1 - \tau_0/T)^2]/$$
$$\left[\alpha_0^2(1 - \tau_0/T)^2 \sum_{n \neq k} \left(\frac{\sin(n-k)(1 - \tau_0/T)\pi}{(n-k)(1 - \tau_0/T)\pi}\right)\right]^2$$

From equation 21, the signal power to interference power ratio $S_k/I_k$ is expressed by the following equations:

$$(S_k/I_k)_{max} = \left[\frac{1 + \alpha_0(1 - \tau_0/T)}{\alpha_0(1 - \tau_0/T)}\right]^2 / \quad (22)$$
$$\sum_{m \neq k}\left[\frac{\sin(n-k)(1 - \tau_0/T)\pi}{(n-k)(1 - \tau_0/T)\pi}\right]^2$$
$$(S_k/I_k)_{min} = \left[\frac{1 - \alpha_0(1 - \tau_0/T)}{\alpha_0(1 - \tau_0/T)}\right]^2 / \quad (23)$$
$$\sum_{m \neq k}\left[\frac{\sin(n-k)(1 - \tau_0/T)\pi}{(n-k)(1 - \tau_0/T)\pi}\right]^2$$

Equations 20 to 23 are computed assuming that the DFT time window coincides with the main signal. If the DFT time window is deviated, the signal power to interference power ratio $S_k/I_k$ further falls.

Figure 4:
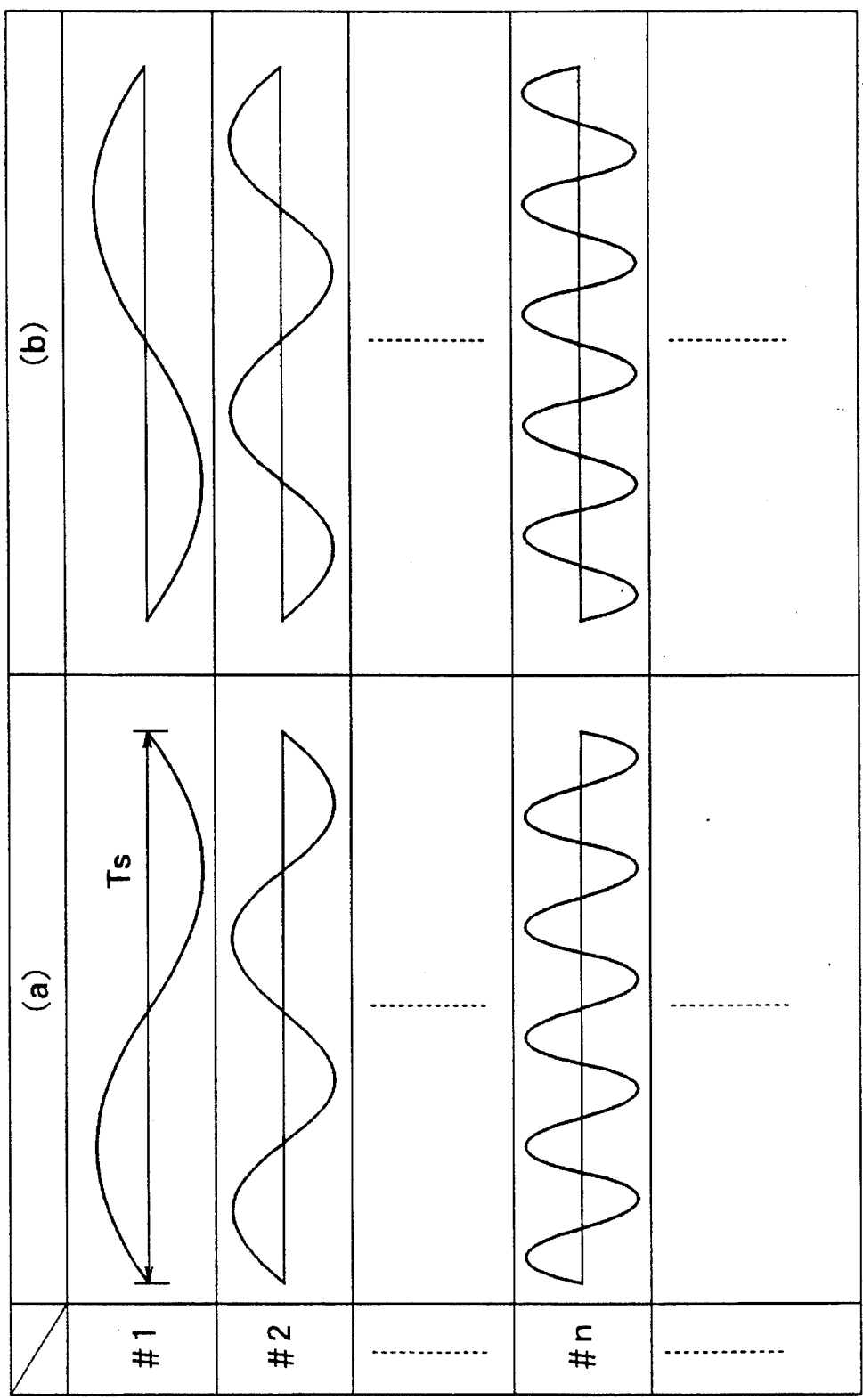
FIG. 4 is a view explaining data transmission by the carrier wave signal of the OFDM format.

An explanation will be made of the OFDM referring to FIG. 4. FIG. 4 is a view for explaining data transmission by the carrier wave signals of the OFDM.

The signals shown by the symbols #k (k is a whole integer) show the waveforms of the carrier wave signals of a period $T_s/k$ in the respective time intervals (symbol intervals) $T_s$. The waveform shown in (a) of FIG. 4 and the waveform shown in (b) of FIG. 4 show the carrier wave signal waveforms in the case of the values of the digital data 1 and 0 to be transmitted.

A predetermined certain time interval T, is used as the symbol duration.

The #1 to #n in FIG. 4 show the cases of the carrier wave signals #1 to #n of periods of $T_s$ to $T_s/n$. These carrier wave signals #1 to #n are arranged in order. If the amplitudes and the phases of these carrier wave signals are defined by the data to be transmitted, then it is possible to define the waveforms of the symbols by the digital data to be transmitted.

The carrier wave signal waveform shown in (a) of FIG. 4 and the carrier wave signal waveform shown in (b) of FIG. 4 are defined. The transmitter in which the OFDM modulation apparatus is provided assigns the signals of the waveform shown in (a) of FIG. 4 the logical value 1 and assigns the signals of the waveform shown in (b) of FIG. 4 the logical value 0 and therefore can transmit digital data for each carrier wave signal.

In the examples shown in (a) of FIG. 4 and (b) of FIG. 4, the carrier wave signals are modulated by BPSK defined in two phase states and 1 bit of digital data is transmitted for each carrier wave signal, but it is also possible to define more phases and amplitudes for each carrier wave signal and transmit more values. That is, those waveforms are obtained by defining the amplitudes and phases of the carrier wave signals.

The processing operation for obtaining the waveforms generally becomes the inverse Fourier transformation (IFT) processing or, in the case of handling digital data, the IDFT processing, so in an OFDM modulation apparatus, it is possible to obtain an OFDM modulated signal using the IDFT circuit. Further, in an OFDM demodulation apparatus, for digital data, it is possible to demodulate an OFDM modulated signal using a discrete Fourier transformation (DFT) circuit.

First Embodiment: OFDM Modulation Apparatus (OFDM Transmitter

Figure 5:
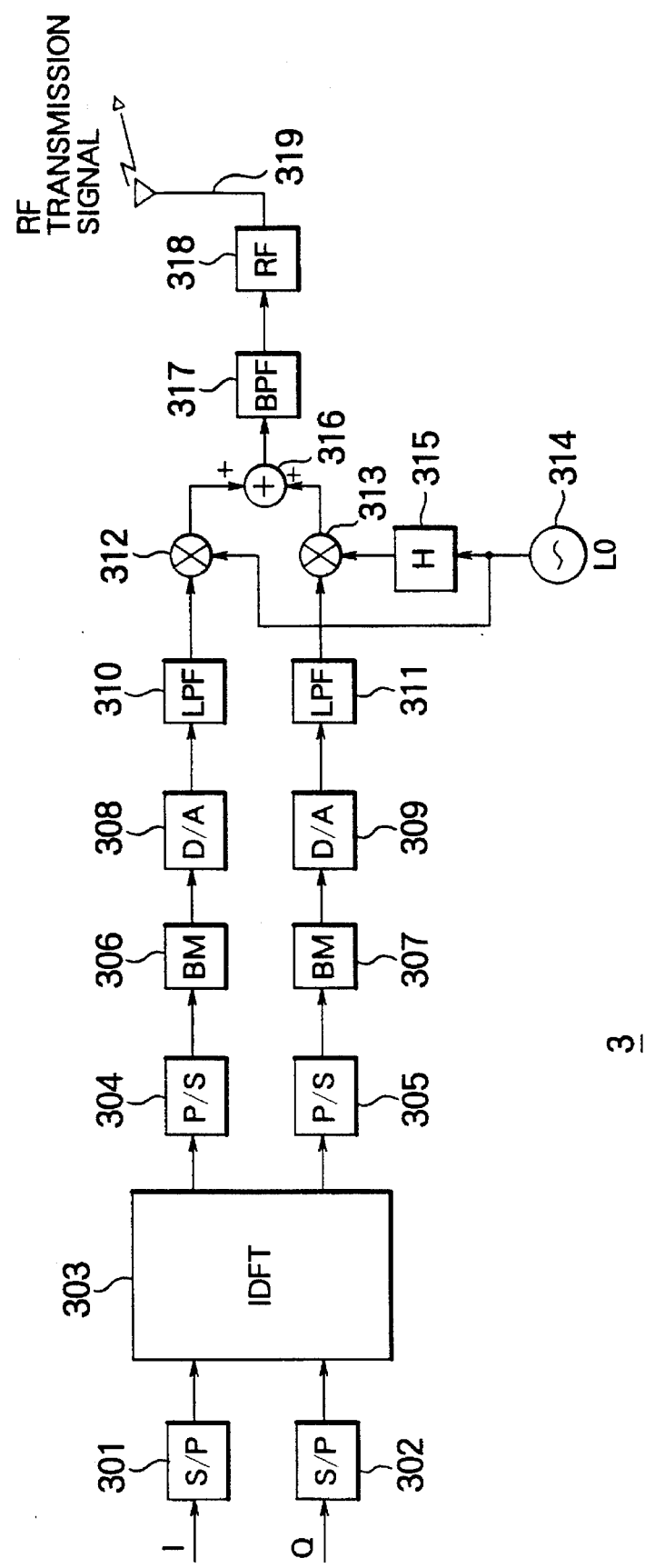
FIG. 5 is a view of the configuration of an OFDM modulation apparatus according to a first embodiment of the present invention and a portion of the transmission apparatus including the OFDM modulation apparatus.

FIG. 5 is a view of the configuration of an OFDM modulation apparatus 3 of an embodiment of the present invention.

The OFDM modulation apparatus 3 is comprised of S/P converters 301 and 302, an IDFT circuit 303, P/S converters 304 and 305, buffer memories 306 and 307, D/A converters 308 and 309, low pass filters 310 and 311, multipliers (frequency convertors) 312 and 313, a local oscillator 314, a 90° phase shifter 315, an adder 316, a bandpass filter 317, and an RF converter 318.

The I channel signals and the Q channel signals, which are in an orthogonal relationship, are respectively input into the S/P converters 301 and 302. Note that the I channel signals and the Q channels signals have each added to them synchronization symbols used for generation of the DFT time window signals required for the DFT processing in the later mentioned OFDM demodulation apparatus and for synchronization.

The S/P converters 301 and 302 perform serial/parallel conversion on the input digital format I channel signals and Q channel signals to produce parallel data which are then output to the IDFT circuit 303.

The IDFT circuit 303 performs IDFT processing on the orthogonal relationship I channel signals and Q channel signals applied from the S/P converters 301 and 302 to convert the input signals from the frequency regions to the time regions and outputs the results to the P/S converters 304 and 305.

The IDFT computation in the IDFT circuit 303 is expressed by the following equation:

$$x(n) = \frac{1}{N} \sum_{n=0}^{N-1} X(k)\exp(j2\pi kn/N) \quad (24)$$

where,

X(k) is input data to IDFT circuit x(n) is output data of IDFT circuit

Figure 7:
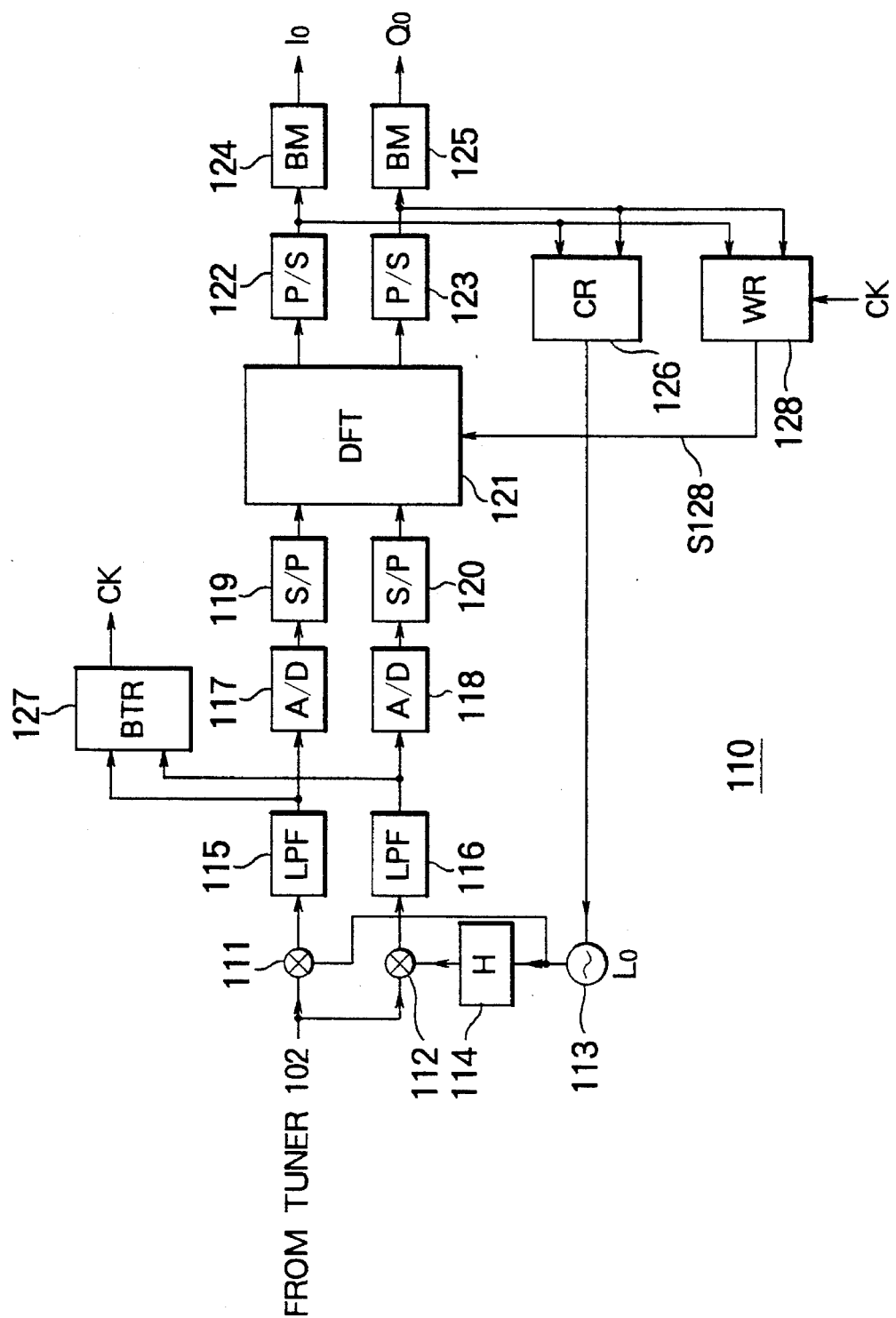
FIG. 7 is a view of the configuration of the OFDM demodulation apparatus shown in FIG. 3.

At this time, the IDFT circuit 303 performs IDFT processing so that the IDFT coefficient of a predetermined frequency component arranged with the OFDM demodulation apparatus 110 shown in FIG. 7 in advance becomes 0.

The IDFT circuit 303 performs IDFT processing on the parallel format frequency region I channel signals and Q channel signals to convert them to time region signals. In the IDFT circuit 303, computation is performed so that the above-mentioned frequency component becomes 0. That is, the IDFT circuit 303 makes the IDFT coefficient corresponding to a predetermined carrier wave signal in the IDFT processing results a fixed value, for example, 0, makes the amplitude of the carrier wave signal of the OFDM modulated signal obtained as a result of the IDFT processing 0, or generates time region I channel signals and Q channel signals so that the amplitude of the carrier wave signal of the OFDM modulated signal becomes 0.

The P/S converters 304 and 305 convert the parallel format output signals (coefficients) of the IDFT circuit 303 to serial format signals and apply the same to the buffer memories 306 and 307. The buffer memories 306 and 307 perform processing such as adding guard intervals to the signals input from the P/S converters 304 and 305 and outputs the same to the D/A converters 308 and 309. The D/A converters 308 and 309 convert the digital signals applied from the buffer memories 306 and 307 to analog signals and apply the results to the low pass filters 310 and 311. The low pass filters 310 and 311 perform filtering on the signals from the D/A converters 308 and 309 to remove the return signal components and output the results to the multipliers 312 and 313.

The local oscillator 314 generates a carrier wave signal having the local oscillation frequency and outputs the same to the multiplier 312 and the 90° phase shifter 315. The 90° phase shifter 315 shifts by 90° the carrier wave signal input from the local oscillator 314 and outputs the result to the multiplier 313.

The multipliers 312 and 313 respectively multiply the local oscillation signal input from the local oscillator 314, that is, the carrier wave signal, and the carrier wave signal comprised of this carrier wave signal shifted 90° in phase by the 90° phase shifter 315 and the output signals from the low pass filters 310 and 312 from which the return signal components have been removed, convert the input signals in frequency to signals of an intermediate frequency band, and output the results to the adder 316.

The carrier wave signals modulated by the multipliers 312 and 313 by the output signals from the low pass filters 310 and 311 are combined by the adder 316.

The bandpass filter 317 restricts the combined output signal of the adder 316 to a predetermined frequency band width and outputs the result to the RF converter 318.

The RF converter 318 converts the signal restricted in band in the bandpass filter 317 to the transmission frequency and sends it out over the air as the transmission signal from the transmission antenna 319.

In the above way, the OFDM modulated signal modulated by the OFDM modulation apparatus 3 is sent to the OFDM receiver 2 shown in FIG. 7.

In this way, the OFDM modulation apparatus 3 sends out an OFDM modulated signal which can be subjected to signal processing more accurately to demodulate the OFDM modulated signal in the OFDM receiver 2, more specifically, the later mentioned OFDM demodulation apparatus 110.

Second Embodiment: OFDM Receiver

An explanation will now be given of an OFDM receiver having an OFDM demodulation apparatus as a second embodiment of the digital demodulation apparatus of the present invention.

Figure 6:
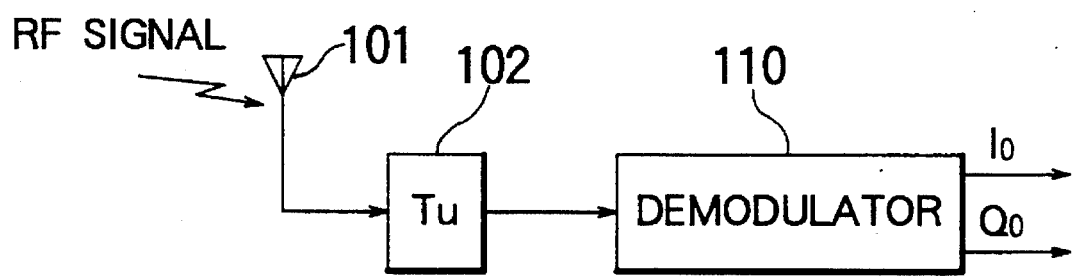
FIG. 6 is a view of the configuration of an OFDM receiving apparatus including an OFDM demodulation apparatus according to a second embodiment of the present invention.

FIG. 6 is a view of the configuration of the OFDM receiver 2 according to a second embodiment of the present invention.

The OFDM receiver 2 receives and demodulates for example a digital video signal sent by wireless transmission as the OFDM modulated signal from a transmitter having the OFDM modulation apparatus 3 explained with reference to FIG. 5. Below, an illustration will be made of the case of receiving an OFDM modulated signal from the OFDM modulation apparatus 3 illustrated in FIG. 5.

The OFDM receiver 2 is provided with a receiving antenna 101, a tuner 102, and an OFDM demodulation apparatus 110 and receives and demodulates the OFDM modulated signal.

The receiving antenna 101 captures the RF signal from the OFDM modulation apparatus 3 shown in FIG. 5 which had been subjected to OFDM processing and sent out as a radio wave.

The tuner 102 converts the received RF signal captured by the receiving antenna 101 into a predetermined intermediate frequency (IF) signal, amplifies it, and outputs it to the OFDM demodulation apparatus 110.

The OFDM demodulation apparatus 110 demodulates the I channel signal $I_0$ and Q channel signal $Q_0$ of the base band from the IF signal applied from the tuner 102.

FIG. 7 is a view of the circuit configuration of the OFDM demodulation apparatus 11 shown in FIG. 6.

The OFDM demodulation apparatus 110 is comprised of multipliers (frequency convertors) 111 and 112, a local oscillator 113, a 90° phase shifter 114, low pass filters 115 and 116, A/D converters 117 and 118, S/P conversion circuits 119 and 120, a DFT circuit 121, P/S converters 122 and 123, buffer memories 124 and 125, a carrier wave signal reproduction circuit 126, a BTR circuit (clock recovery circuit) 127, and a DFT time window synchronization signal generating circuit 128.

The OFDM demodulation apparatus 110 has a circuit configuration similar to the OFDM demodulation apparatus 85 illustrated in FIG. 1.

The points of difference between the OFDM demodulation apparatus 85 shown in FIG. 1 and the OFDM demodulation apparatus 110 will now be explained. In the BTR circuit 869 shown in FIG. 1, both of the clock signal CK and the DFT time window signal were produced, but the bit timing reproduction circuit 127 in the OFDM demodulation apparatus 110 produces only the clock signal CK. Further, the OFDM demodulation apparatus 110 is provided with a DFT time window synchronization signal generating circuit 128, which DFT time window synchronization signal generating circuit 128 generates a DFT time window signal and applies it to the DFT circuit 121.

In FIG. 7, the multipliers 111 and 112 respectively multiply the IF signal output from the tuner 102 and local oscillation signal from the local oscillator 113 and the IF signal and output signal of the local oscillator 113 shifted in phase 90° by the 90° phase shifter 116 to convert the IF signal in frequency to a signal of the basic frequency band and output the results to the low pass filters 115 and 116.

The low pass filters 115 and 116 respectively pass only the predetermined frequency component signals in the base band signals converted in frequency by the multipliers 111 and 112 and remove the unnecessary high frequency component. The output signals of the low pass filters 115 and 116 are applied to the BTR circuit 12 and the A/C converters 117 and 118.

The A/D converters 117 and 118 convert the output signals of the low pass filters 115 and 116 to digital signals.

The S/P converters 119 and 120 convert the serial digital signals output from the A/D converters 117 and 118 to parallel signals and output them to the DFT circuit 121.

The DFT circuit 121 performs DFT processing on the digital signals output from the S/P converters 119 and 120 to convert the digital signals from the time region to the frequency region. The frequency converted signals are converted to serial signals in the P/S converters 122 and 123.

The DFT computation in the DFT circuit 121 is expressed by the following equation:

$$X(k) = \sum_{n=0}^{N-1} x(n)\exp(-j(2\pi kn/N)) \quad (25)$$

where,

X(k) is input data to DFT circuit x(n) is output data of DFT circuit

The output signals of the P/S converters 122 and 123 are applied to the buffer memories 124 and 125 and are processed so as to remove the guard intervals etc. and then are output as the signal $I_0$ and signal $Q_0$.

The output signals of the P/S converters 122 and 123 are also applied to the carrier wave signal reproduction circuit 126 and the DFT time window synchronization signal generating circuit 128.

Figure 3:
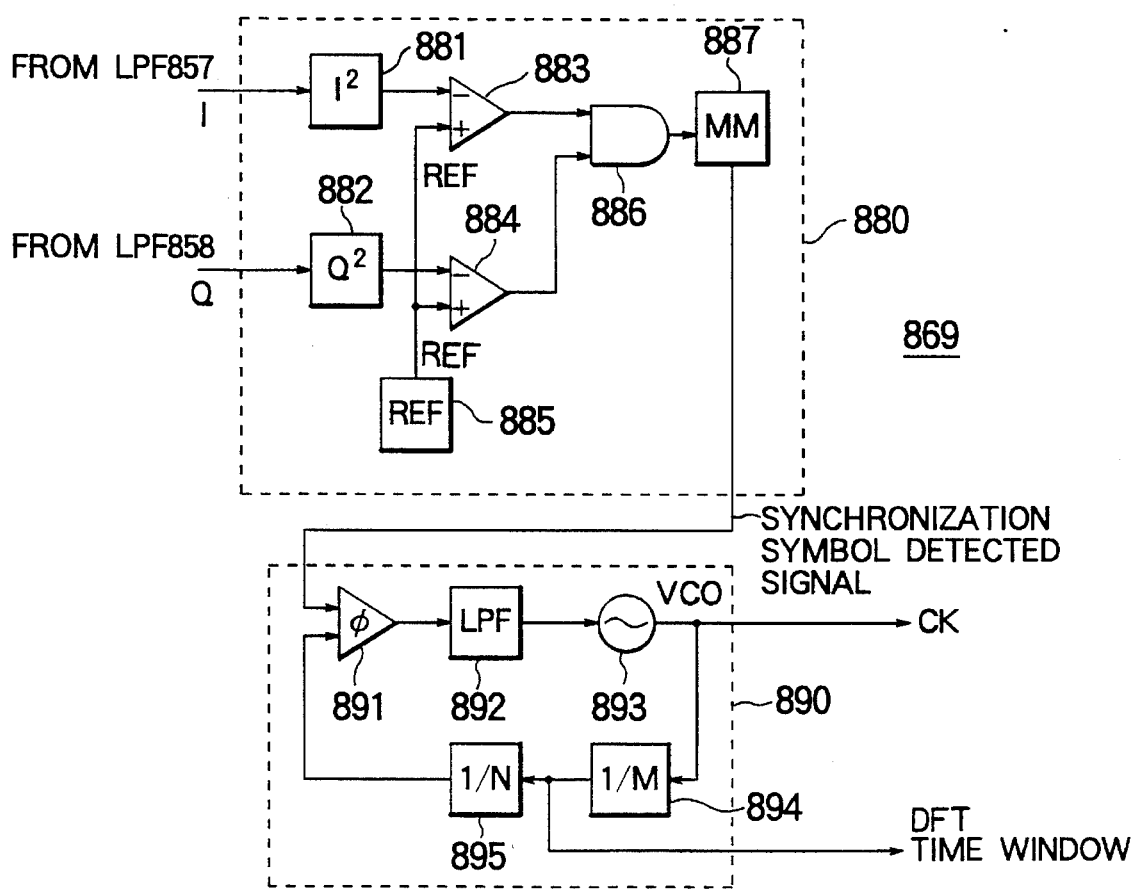
FIG. 3 is a view of the configuration of a clock reproduction circuit shown in FIG. 1.

The carrier wave signal reproduction circuit 126 is for example comprised of a Costa loop circuit similar to that illustrated in FIG. 3. It generates a control voltage based on the output signals of the P/S converters 122 and 123 and controls the local oscillator 113 by the control voltage so as to make it generate a local oscillation signal having a predetermined frequency.

The local oscillator 113 houses for example a voltage controlled oscillator (VCO) and generates a local oscillation signal of an oscillation frequency in accordance with the voltage (control voltage) applied from the carrier wave signal reproduction circuit 126.

The 90° phase shifter 114 shifts the phase of the output signal of the local oscillator 113 by 90° and applies the result to the multiplier 112.

The BTR circuit 127 has a circuit configuration similar to the BTR circuit 869 shown in FIG. 1 and produces only a clock signal CK based on the output signals of the low pass filters 115 and 116. That is, the BTR circuit 127 does not generate a DFT time window signal, but generates only a clock signal CK. The clock signal CK is used for the operation in the circuit of the OFDM demodulation apparatus 110 as a whole, but in particular in the present invention the clock signal CK is used for the generation of the DFT time window signal S128 in the DFT time window synchronization signal generating circuit 128.

The DFT time window synchronization signal generating circuit 128 divides the clock signal CK from the BTR circuit 127 to 1/M to generate the DFT time window signal, but in the present invention it synchronizes with the synchronization symbol and controls the phase DFT time window signal based on the output signals of the P/S converters 122 and 123 to generate the DFT time window signal S128 at an accurate timing (phase). The DFT time window signal S128 is applied to the DFT circuit 121 and used for selecting the accurate signal.

Next, an explanation will be made of the principle of the synchronization pull-in operation of the DFT time window signal.

On the transmission side, IDFT is performed for modulation so that the amplitude of the predetermined frequency component of the OFDM modulated signal becomes 0. When the thus generated OFDM modulated signal is demodulated at the receiving side by DTF, if synchronization of the DFT time window is achieved, the DFT coefficient of the predetermined frequency component becomes 0. On the other hand, if synchronization of the DFT time window is not achieved, the DFT coefficient of the predetermined frequency component does not become 0.

Therefore, a specific carrier wave set at the transmission side is monitored out of the DFT output of the DFT circuit 121 and control is exercised so that the accumulated sum ΣD becomes minimum, thereby enabling synchronization of the DFT time window.

The above-mentioned principle of synchronization is explained referring to FIGS. 8A to 8C and FIG. 9.

FIG. 8A is a graph showing a part of the frame configuration of an OFDM modulated signal received at the receiving antenna 101, FIG. 8B is a graph showing the case where the DFT time window signal fits in a single symbol, and FIG. 8C is a graph showing the case where the DFT time window signal fits into two symbols.

Figure 9:
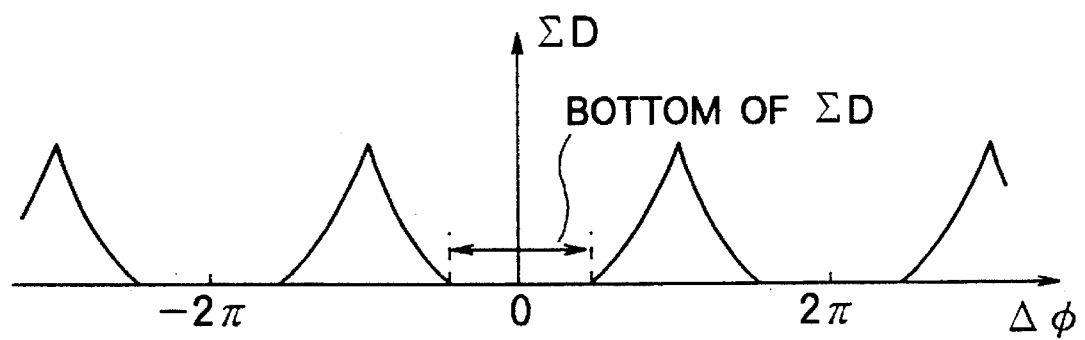
FIG. 9 is a graph showing the relationship between ΣD comprising the sum of the absolute values or the sum of the squares of the DFT outputs of the frequency component set to give an amplitude of 0 at the transmission side and Δφ comprising the phase error of the DFT time window.

FIG. 9 is a graph having as its vertical axis the accumulated sum ΣD of the DFT outputs of the DFT circuit 121 for the frequency component set to give an amplitude of 0 at the transmission side and having as its horizontal axis the phase error Δφ of the DFT time window and shows the relationship between the two.

Consider the OFDM modulated signal shown in FIG. 8A.

Here, assume the time window of the IDFT processing at the transmission side is $T_a$, the guard interval is $T_g$, and the symbol duration is $T_s$.

When the DFT time window at the OFDM demodulation apparatus 110 of the OFDM receiver 2 fits in a single symbol, the DFT coefficient of the predetermined frequency component becomes 0, but when the DFT time window spans two symbols, the frequency component set at the transmission side does not become 0. As shown in FIG. 9, even if the phase error Δφ is not 0, if a value of a phase error Δφ enters a certain extent around it, the accumulated sum ΣD of the DFT output of the DFT circuit 121 becomes 0. This is due to the effect of the guard interval.

In FIG. 9, the accumulated sum ΣD of the DFT output becomes 0 in a certain range, but in an actual transmission system, there are additional types of interference such as noise and multiple path interference in the middle of the transmission. Accordingly, the accumulated sum ΣD does not necessarily become 0. If synchronization of the phase of the DFT time window signal is achieved, however, the accumulated sum ΣD should become the minimum.

From the above, by controlling the phase of the DFT time window signal to give the minimum accumulated sum ΣD of the DFT output, it is possible to establish synchronization of phase of the DFT time window signal.

The DFT time window synchronization signal generating circuit 128 divides the clock signal CK generated at the BTR circuit 127 to 1/M to generate the basic DFT time window signal and further performs phase control of the DFT time window signal based on the above-mentioned principle.

An explanation will now be made of the circuit configuration of the DFT time window synchronization signal generating circuit 128 with reference to FIG. 10.

Figure 10:
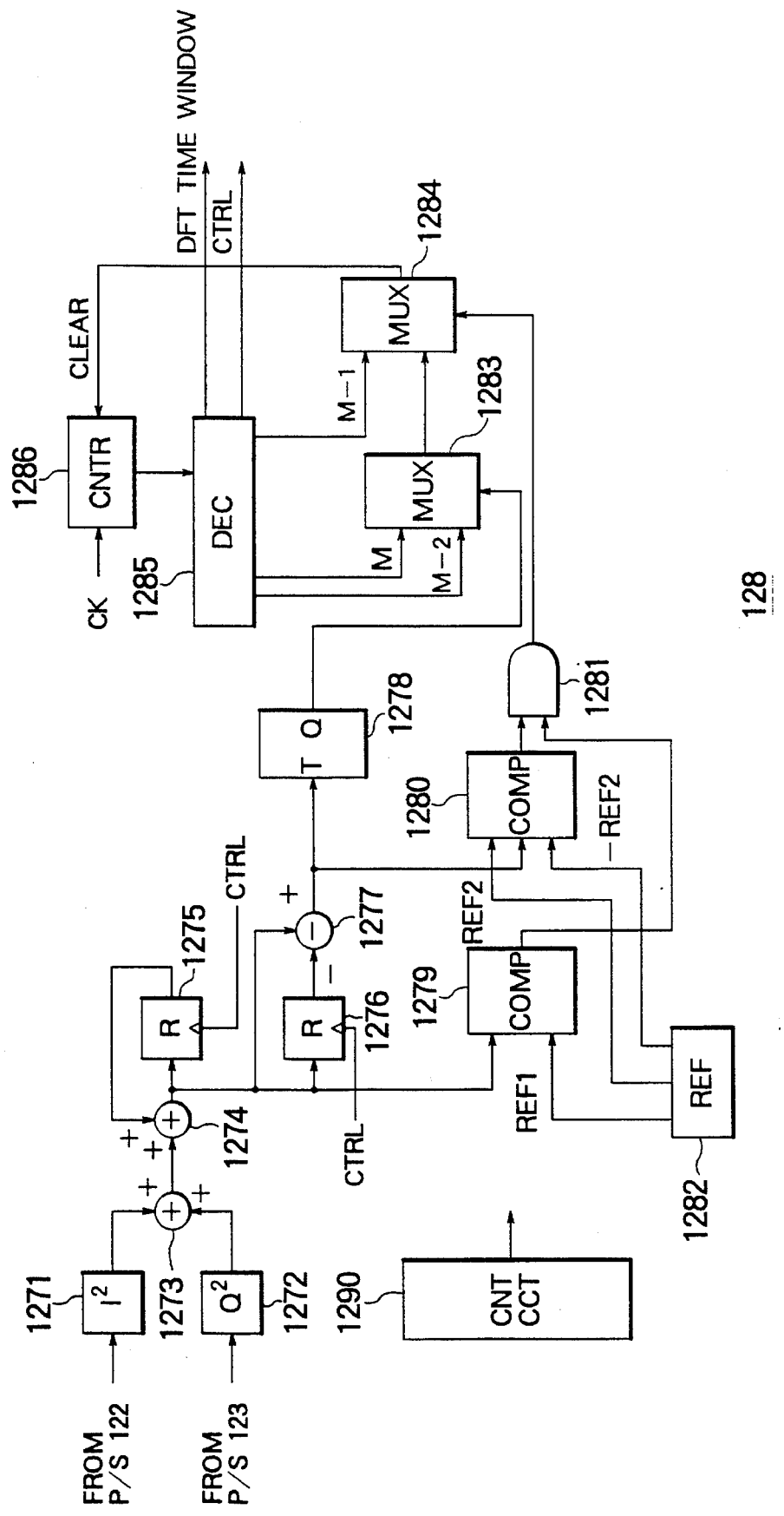
FIG. 10 is a view of the configuration of a DFT time window synchronization circuit shown in FIG. 7.

FIG. 10 is a view of the circuit configuration of the DFT time window synchronization signal generating circuit 128.

Note that for the operational processing of the plurality of circuits in FIG. 8, use is made of the clock signal CK generated at the BTR circuit 127, but for simplification of the illustration, the connections are omitted.

The DFT time window synchronization signal generating circuit 128 is comprised of the doublers 1271, 1272, the adder 1273, adder 1274, register 1275, register 1276, subtractor 1277, and T type flip-flop 1278.

The DFT time window synchronization signal generating circuit 128 is further provided with a comparator 1279, a comparator 1280, an AND circuit 1281, and a reference signal generating circuit 1282.

The DFT time window synchronization signal generating circuit 128 is further provided with a multiplexer 1283, a multiplexer 1284, a decoder 1285, and a counter 1286.

Further, the DFT time window synchronization signal generating circuit 128 is provided with a control circuit 1290 for controlling the above-mentioned circuits.

In the DFT time window synchronization signal generating circuit 128, the counter 1286 counts the clock signals from the BTR circuit 127, while the decoder 1285 detects when the count of the clock signals CK has reached M and then issues a DFT time window signal. That is, the counter 1286 and the decoder 1285 constitute a DFT time window generating circuit which divides the clock signal CK to 1/M to generate the DFT time window signal.

In the doublers 1271 and 1272, the square values of the DFT outputs of the I and Q channels from the DFT circuit 121, that is, the instantaneous energies, are calculated. These instantaneous energies are added to calculate the combined instantaneous energy at the adder 1273.

The adder 1274 and register 1275 constitute an accumulated sum circuit. That is, the accumulated sum up to the previous time is stored in the register 1275 and the new energy from the adder 1273 is added to the accumulated sum of the energy stored in the register 1275. The value of the register 1275, however, is cleared by the control signal CTRL from the decoder 1285. The details are given later.

The instantaneous energy from the adder 127 is stored in the register 1276. The subtractor 1277 calculates the difference between the previous instantaneous energy stored in the register 1276 and the current instantaneous energy directly applied from the adder 1274.

The T type flip-flop 1278 changes the output level each time the value of the subtractor 1277 changes from positive to negative or from negative to positive. That is, the T type flip-flop 1278 changes the output level each time the relationship of size between the previous instantaneous energy and the current instantaneous energy changes.

The output of the T type flip-flop 1278 is used for the signal selection of the multiplexer 1283. The multiplexer 1283 cooperates with the counter 1286 and the decoder 1285 to perform phase control of the DFT time window. The details are discussed later.

The output of the adder 1274 is applied to the comparator 1279, while the output of the adder 1277 is applied to the comparator 1280 for comparison. The comparator 1279, the comparator 1280, and the AND circuit 1281 cooperate with the multiplexer 1284 and the counter 1286 to perform the above-mentioned synchronization pull-in operation. The details are discussed later.

The basic operation of the circuits in the DFT time window synchronization signal generating circuit 128 will be explained next.

The doublers 1271 and 1272 square the Q channel signals output from the P/S converter 123. These squaring operations mean calculation of the energy. The squared I channel signal $I^2$ (energy of I channel signal) and Q channel signal $Q^2$ (energy of Q channel signal) are added at the adder 1273.

The adder 1274 adds the result of addition of the adder 1273 and the previous result of addition stored in the register 1275. The result of addition is stored in the register 1275. In this way, the adder 1274 and the register 1275 constitute a cumulative adder.

The accumulated sum ΣD calculated by the adder 1274 is also stored in the register 1276 and is delayed by exactly one operation cycle. The subtractor 1277 subtracts from the current accumulated sum ΣD of the adder 1274 the previous accumulated sum ΣD stored in the register 1276. Accordingly, the register 1276 and the subtractor 1277 constitute an accumulated sum and error calculation circuit which calculates the difference between the previous accumulated sum ΣD and the current accumulated sum ΣD.

The reference signal generating circuit 1282 generates the first to third reference signals REF1, REF2, and −REF2 used in the comparators 1279 and 1280.

The comparator 1279 compares the output signal of the adder 1274 with the first reference signal REF1 output from the reference signal generating circuit 1282 and, when the output signal of the adder 1274 is larger than the first reference signal REF1, outputs to the AND circuit 1281 an output of a logical value 1 signifying that the synchronization symbol has been detected.

The comparator 1280 compares to see if the output signal of the subtractor 1277 is between the second reference signal REF2 and the third reference signal −REF2 output from the reference signal generating circuit 1282 and, when the output signal of the subtractor 1277 is between the reference signals REF2 and −REF2, outputs to the AND circuit 1281 an output of a logical value of 1 showing the presence of the synchronization symbol.

The AND circuit 1281 takes the logical AND of the output signal of the comparator 1279 and the output signal of the comparator 1280 and, when the output of the adder 1274 is smaller than the reference signal REF1 and the output signal of the subtractor 1277 is between the second reference signal REF2 and the third reference signal −REF2, outputs to the multiplexer 1284 an output of a logical value of 1 showing that the synchronization symbol has been detected.

The T type flip-flop 1278 inverts the level of the output when the logical value of the output signal of the subtractor 1277 changes from 0 to 1 and outputs the result to the multiplexer 1283 as the selection signal of the multiplexer 1283.

The multiplexer 1283 selects and outputs to the multiplexer 1284 one of the decode value M and decode value (M−2) output from the decoder 1285 for adjusting the phase of the DFT time window based on the level of the output signal of the T type flip-flop 1278.

The multiplexer 1284 selects, based on the output of the AND circuit 1281, one of the selected output from the multiplexer 1283 and the decode value (M−1) output from the decoder 1285 and outputs the same as the clear signal CLEAR to the counter 1286.

The counter 1286 is cleared using the clear signal CLEAR output from the multiplexer 1284 and then counts the clocks CK from the BTR circuit 127 and outputs the count to the decoder 1285.

The decoder 1285 decodes the count of the counter 1286, detects the counts M, M−1, and M−2, and outputs the same to the multiplexers 1283 and 1284. Further, the decoder 1285 generates a DFT time window signal 128 based on the control of the control circuit 1290 from the count of the counter 1286 and, further, generates the control signal CNTRL for controlling the different portions of the OFDM demodulation apparatus 110.

An explanation will be given below of the overall operation of the DFT time window synchronization signal generating circuit 128.

The DFT time window signal S128 basically is generated by the decoding of the decoder 1285 of the fact that the count of the cloak signals CK of the counter 1286 has reached 1/M. That is, when one symbol has a length of M clocks of the clock signal CK, the decoder 1285 detects that the count output from the counter 1286 has become M−1 and outputs the decode value M−1. This decode value M−1 is applied to the counter 1286 as the clear signal CLEAR through the multiplexer 1284 and initializes (clears) the counter 1286. By this operation, the counter 1286 counts the M number of clock signals CK from 0 to M−1.

An explanation will now be made of the synchronization pull-in operation of the DFT time window synchronization signal generating circuit 128.

The counter 1286, decoder 1285, multiplexer 1283, and multiplexer 1284 are set so as to count the (M+1) number of (M−1) number of clock signals CK. By this setting, the phase of the DFT time window signal S128 is shifted successively by one clock around each symbol.

The DFT time window synchronization signal generating circuit 128 evaluates the frequency component (predetermined frequency component) set at the transmission side so that the amplitude becomes 0 while shifting the phase of the DFT time window signal S128 and finds the phase giving the smallest accumulated sum $\Sigma D$ of the predetermined frequency component and thereby establishes the synchronization of the DFT time window signal S128.

DFT processing is performed in the DFT circuit 121, the I channel signal and the Q channel signal converted to serial signals at the P/S converters 122 and 123 are squared at the doublers 1271 and 1272, and these two squared values are added at the adder 1273. The result o the addition at the adder 1273 corresponds to the instantaneous energy of the coefficient component output from the DFT circuit 121.

In the instantaneous energy, the energy of the predetermined frequency component is calculated for each symbol. The register 1275 is cleared by the control signal CTRL from the decoder 1285 just before the DFT time window signal S128 is generated. Among the DFT coefficients of the DFT circuit 121, only the coefficient component corresponding to the predetermined frequency component at the transmission side is added cumulatively at the adder 1274.

The accumulated sum $\Sigma D$ calculated for one symbol is stored in the register 1276.

The subtractor 1277 calculates the difference between the accumulated sum $\Sigma D$ for the previous symbol already stored in the register 1276 at that point and the current new accumulated sum $\Sigma D$. When the result of the subtraction of the subtractor 1277 is positive, the amplitude of the predetermined frequency component of the newest symbol, which should be 0, is not 0 and, further, is larger than the amplitude of the predetermined frequency component of the symbol one time before. Accordingly, it means that the direction of shift of the phase of the DFT time window signal S128 was opposite, so the output state of the T type flip-flop 1278 is reversed so as to shift the phase of the DFT time window signal S128 in the opposite direction.

The T type flip-flop 1278 controls the multiplexer 1283 and switches between the output decode value (M−2) and decode value M of the decoder 1285. When the count (M−2) of the decoder 1285 had first been selected, the multiplexer 1283 clears the count of the clock signal CK at the counter 1286 through the multiplexer 1284 for each (M−1) clocks. As a result, the phase of the DFT time window signal S128 advances by one clock for each symbol.

If the state of the T type flip-flop 1278 is reversed, the multiplexer 1283 selects the decode value M of the decoder 1285 and further clears the counter 1286 through the multiplexer 1284 for each (M+1) clocks. As a result, the phase of the DFT time window signal S128 is retarded by one clock for every one symbol.

By the operation of the DFT time window synchronization signal generating circuit 128, the phase of the DFT time window signal S128 becomes an unstable state which goes back and forth at the portion of the bottom of the accumulated sum $\Sigma D$ of FIG. 9. This corresponds to control for making the phase of the DFT time window become the portion of the bottom of the accumulated sum $\Sigma D$. The phase of the DFT time window signal S128 constantly moves near the bottom and does not stabilize and stop. If the phase of the DFT time window signal moves in this way, stable demodulation is not possible. Accordingly, it is necessary to stably stop the phase of the DFT time window signal somewhat at the bottom of the accumulated sum $\Sigma D$.

Therefore, the circuit comprised of the comparator 1279, the comparator 1280, and the AND circuit 1281 is used to detect this unstable state, the multiplexer 1284 is set to select the count (M−1) side of the decoder 1285, the count of the counter 1286 is set to M, and the shift operation of the phase of the DFT time window signal S128 is stopped.

At the bottom portion in FIG. 9, the accumulated sum $\Sigma D$ is sufficiently small, so the comparator 1279 compares the value of the accumulated instantaneous energy output from the adder 1274 with the first reference REF1. When the accumulated instantaneous energy is smaller than the first reference (first reference voltage) REF1, the comparator 1279 outputs the logical value 1.

At the portion of the bottom of the accumulated sum $\Sigma D$ even if the phase of the DFT time window signal is deviated by about one clock, the change in the accumulated sum $\Sigma D$ is extremely small, so the output signal of the subtractor 1277 is compared at the comparator 1280. The comparator 1280 outputs the logical value 1 when the value of the output signal of the subtractor 1277 is within the range of the reference value −REF2 to the reference value REF2.

The logical AND of the results of the comparisons of the comparators 1279 and 1280 is taken at the AND circuit 1281 and used to control the multiplexer 1284.

This completes the pull-in operation of the DFT time window synchronization phase of the DFT time window synchronization signal generating circuit 128.

In this embodiment, the counter 1286 was set to (M−1) or (M+1) so as to shift the DFT time window by one clock at a time per one symbol, but it is also possible to enable the count of the counter 1286 to be further changed and to change the amount of phase shift in accordance with the output signal of the subtractor 1277.

Further, the end of the pull-in operation of the DFT time window synchronization signal generating circuit 128 is judged in the second embodiment by a simple logical operation at the AND circuit 1281 of the outputs of the comparators 1279 and 1280, but the pull-in control may be performed by a more complicated logic using a microcomputer as well.

Figure 11:
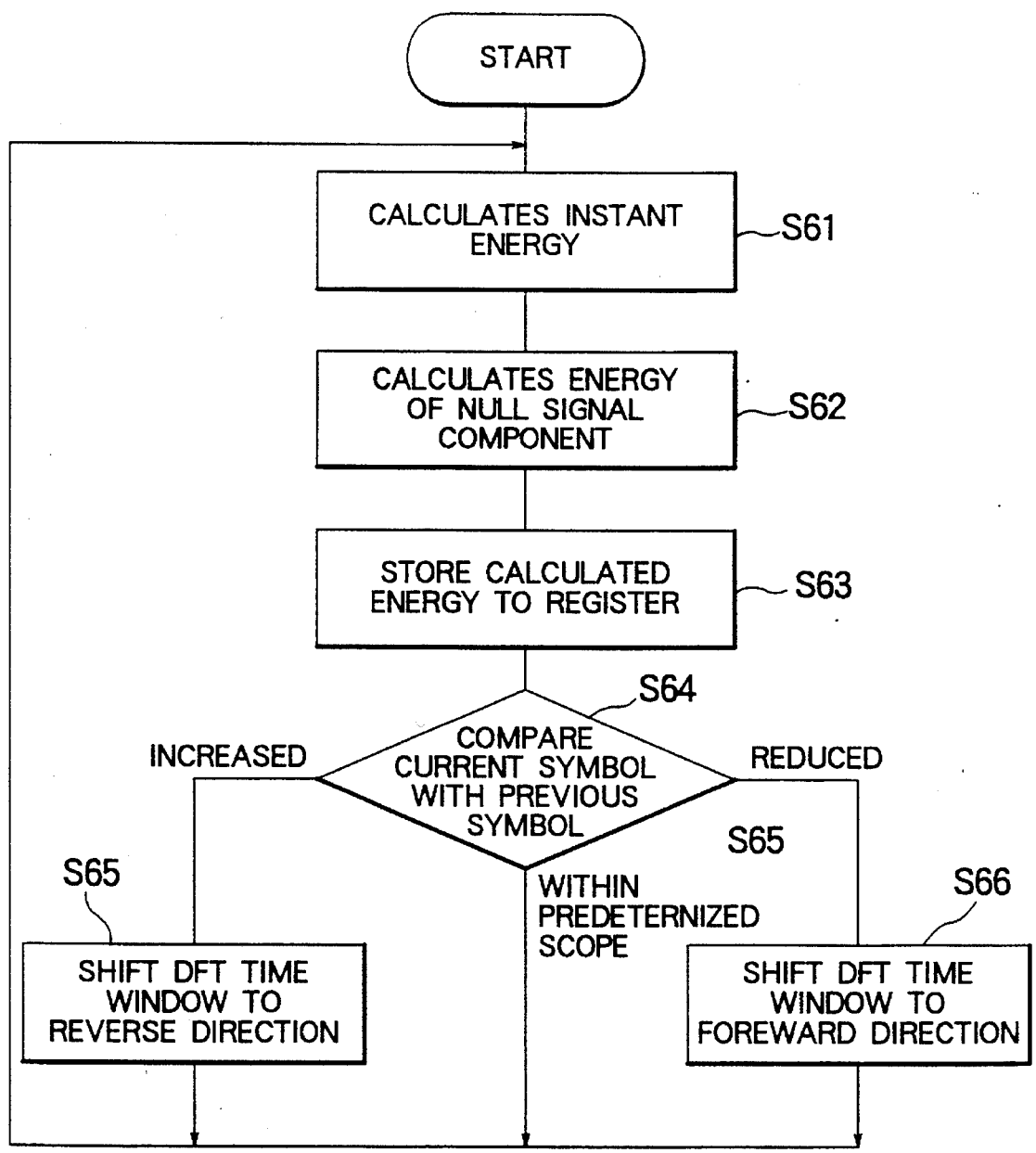
FIG. 11 is a flow chart of the processing for the DFT time window synchronization circuit shown in FIG. 10.

FIG. 11 is a flow chart showing the processing of the DFT time window synchronization signal generating circuit 128.

At step 61 (S61), the doublers 1271 and 1272 and the adder 1273 calculate the instantaneous energy at the symbol.

At step 62 (S62), the adder 1274 and the register 1275 calculate the accumulated sum ΣD of the instantaneous energy to calculate the energy of the predetermined frequency component (null signal component).

At step 63 (S63), the calculated energy of the null signal component is stored in the registers 1275 and 1276.

At step 64 (S64), the subtractor 1277 and the comparator 1280 are used to compare the energy of the null signal component at that time and the null signal component of the previous symbol. When the energy of the null signal component at that time increases, the routine proceeds to the processing of step 65, while when it decreases, the routine proceeds to the processing of step 66. If the change in the null signal component at that time is within a predetermined range, the routine returns to the processing of step 61.

At step 65 (S65), the DFT time window synchronization signal generating circuit 128 shifts the phase of the DFT time window signal in the direction opposite to that of the past.

At step 66 (S66), the DFT time window synchronization signal generating circuit 128 shifts the phase of the DFT time window signal in the same direction as in the past.

By the above, a DFT time window signal S128 synchronized in phase with the synchronization symbol is produced. The DFT circuit 121 uses this DFT time window signal S128 to select the output digital signals of the S/P converters 119 and 120 and performs DFT processing on the selected signals.

The outputs of the DFT circuit 121 are converted to serial format signals by the P/S converters 122 and 123 and are stored in the buffer memories 124 and 125.

The serial signals converted by the P/S converters 12 and 123 have removed from them in the buffer memories 124 and 125 the guard intervals which had been added at the time of modulation in the OFDM modulation apparatus 3 and the results are output as the digital format signal $I_0$ and signal $Q_0$.

Third Embodiment: Improved OFDM Modulation Apparatus

The third embodiment of the present invention will be explained below.

In the OFDM demodulation apparatus 110 shown in the second embodiment, due to the synchronization operation of the DFT time window synchronization signal generating circuit 128, the phase of the DFT time window signal went back and forth near the bottom of the accumulated sum ΣD shown in FIG. 9.

The DFT time window synchronization signal generating circuit 128 operates to search for the bottom of the accumulated sum ΣD, but the bottom is not unilaterally determined, but there are continuous bottoms, so the phase of the DFT time window signal behaves in this way. That is, the phase of the DFT time window is not constantly at a stop, but moves back and forth at the portion of the bottom of the accumulated sum ΣD, so the phases of the demodulated output signals $I_0$ and $Q_0$ obtained as the DFT coefficient do not stabilize.

Therefore, in the DFT time window synchronization signal generating circuit 128 shown in FIG. 10, the circuit comprised of the comparators 1279 and 1280 and the AND circuit 1281 is used to detect the state where the phase of the DFT time window is at the bottom of ΣD and the multiplexer 1284 is made to select the count (M−1) of the decoder 1285 to initialize the counter 1286 (clear), thereby setting the count at M and stopping the phase shift of the DFT time window signal S128.

In the second embodiment (OFDM demodulation apparatus 110), the phase deviation of the DFT time window was monitored and the OFDM modulated signal was demodulated by the same DFT circuit 121. Accordingly, due to the nature of the algorithm, to confirm if the intensity of the carrier wave signal set at the transmission side to an amplitude of 0 was the smallest with respect to the phase of the DFT time window signal, it is necessary to change the phase of the DFT time window signal and see. If the phase of the DFT time window signal is changed in this way for optimization, the phases of the carrier wave signals of the demodulated I channel signal $I_0$ and Q channel signal $Q_0$ also change, so demodulation sometimes becomes difficult.

To avoid this inconvenience, in the DFT time window synchronization signal generating circuit 128 of the second embodiment, when once the phase of the DFT time window was confirmed, that phase was continuously held. Accordingly, when the state of the transmission path changed, the phase of the DFT time window signal could not easily follow that change and therefore sometimes it was not possible to obtain the optimal phase of the DFT time window signal.

To avoid this inconvenience, the circuit comprised of the comparators 1279 and 1280 and the AND circuit 1281 was provided, but even with provision of this circuit, it is not necessarily possible to cope with changes in state of the transmission path.

The OFDM demodulation apparatus 15 of the third embodiment of the present invention solves these inconveniences in the OFDM demodulation apparatus 110 of the second embodiment and enables the phase of the DFT time window signal to be held optimal at all times and excellent demodulation performance to be obtained.

An explanation will next be made of the configuration of the OFDM demodulation apparatus 15 of the third embodiment of the present invention referring to FIG. 12.

The OFDM demodulation apparatus 15 has a similar configuration to the OFDM receiver 2 having the OFDM demodulation apparatus 110 shown as the second embodiment. Portions given the same references in the OFDM demodulation apparatus 15 and the OFDM receiver 2 including the OFDM demodulation apparatus 110 are the same.

The points of difference of the OFDM demodulation apparatus 15 and the OFDM demodulation apparatus 110 will be explained next. In the OFDM demodulation apparatus 15, there are provided a second DFT circuit 171, P/S converters 172 and 173, a time window signal generating circuit 174, a clock/carrier wave signal generating circuit 175, and a clock generating circuit 176.

The second DFT circuit 171 performs an equivalent DFT as the first DFT circuit 121. The coefficient, however, is different. The P/S converters 172 and 173 convert the result of the transformation of the second DFT circuit 171 to a serial signal. The time window signal generating circuit 174 includes a microcomputer and generates a time window signal DFT1 to the DFT circuit 121 and a time window signal DFT2 to the second DFT circuit 171. The clock/carrier wave signal generating circuit 175 performs a similar Costas control as illustrated in FIG. 3 on the output signals of the P/S converters 122 and 123, controls the local oscillator 113 including the voltage controlled oscillator (VCO) to cause it to generate a carrier wave signal, and controls the clock generating circuit 176 to cause it to generate a clock signal CK.

The clock generating circuit 176 is a VCO included in the

BTR circuit 127 of the second embodiment and oscillates in accordance with the control voltage from the clock/carrier wave signal generating circuit 175 to generate a clock signal CK.

The OFDM receiver having the OFDM demodulation apparatus 15 receives the OFDM modulated signal from the OFDM modulation apparatus 3 of the first embodiment or an OFDM signal which is generated by the I channel and Q channel signals output from an ordinary OFDM modulation apparatus so as to give an amplitude of 0 to a predetermined frequency component and detects the strength of the predetermined frequency component. The strength of the frequency component becomes 0 when the phase of the DFT time window signal is accurately matched as shown in FIG. 8B. However, as shown in FIG. 8C, when the phase of the DFT time window signal is not matched with, the strength of the predetermined frequency component does not become 0.

Therefore, the OFDM demodulation apparatus 15 receives the OFDM modulated signal, demodulates it in the same way as in the second embodiment by the first DFT circuit 121, demodulates the OFDM modulated signal by the second DFT circuit 171, and monitors the specific carrier wave signal set to give an amplitude of 0. That is, it constantly searches for a phase of the DFT time window signal giving the smallest accumulated sum ΣD corresponding to the specific carrier wave signal. The time window signal generating circuit 174 analyzes and evaluates the result of this search, decides on the phase of the DFT time window signal DFT1, and controls the time window of the first DFT circuit 121.

By the control of the phase of the DFT time window signal DFT1, the phase of the DFT time window signal is not changed when the phase of the time window signal is accurately obtained (synchronized with). As a result, it is possible to keep the phase of the time window of the first DFT circuit 121 optimal at all times and further there is no useless change made in the phase of the demodulated output, so it is possible for the OFDM demodulation apparatus 15 to perform stable demodulation of the OFDM modulated signal.

An explanation will be made below of the circuit configuration of the time window signal Generating circuit 174.

Figure 12:
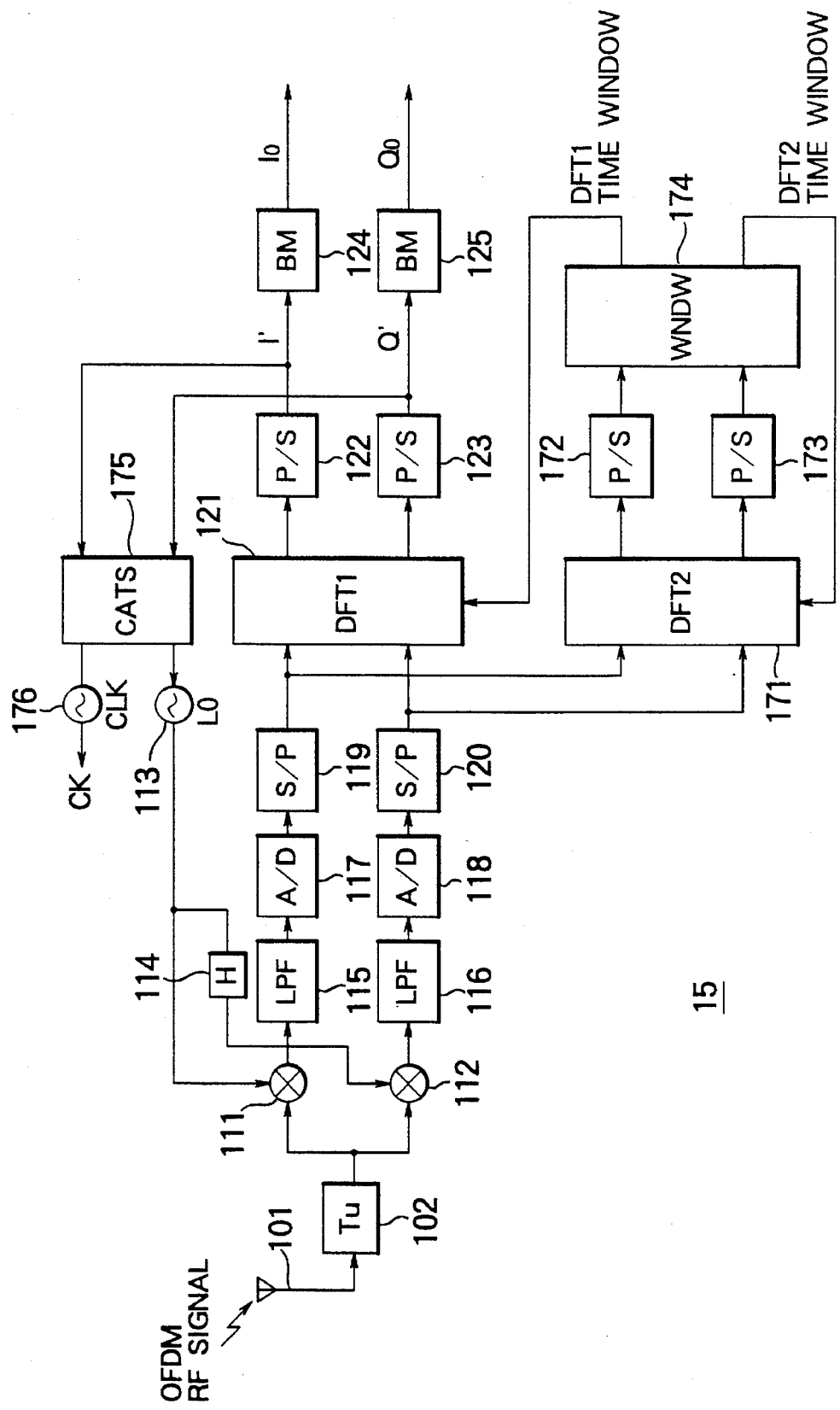
FIG. 12 is a view of the configuration of the OFDM demodulation apparatus according to a third embodiment of the present invention.
Figure 13:
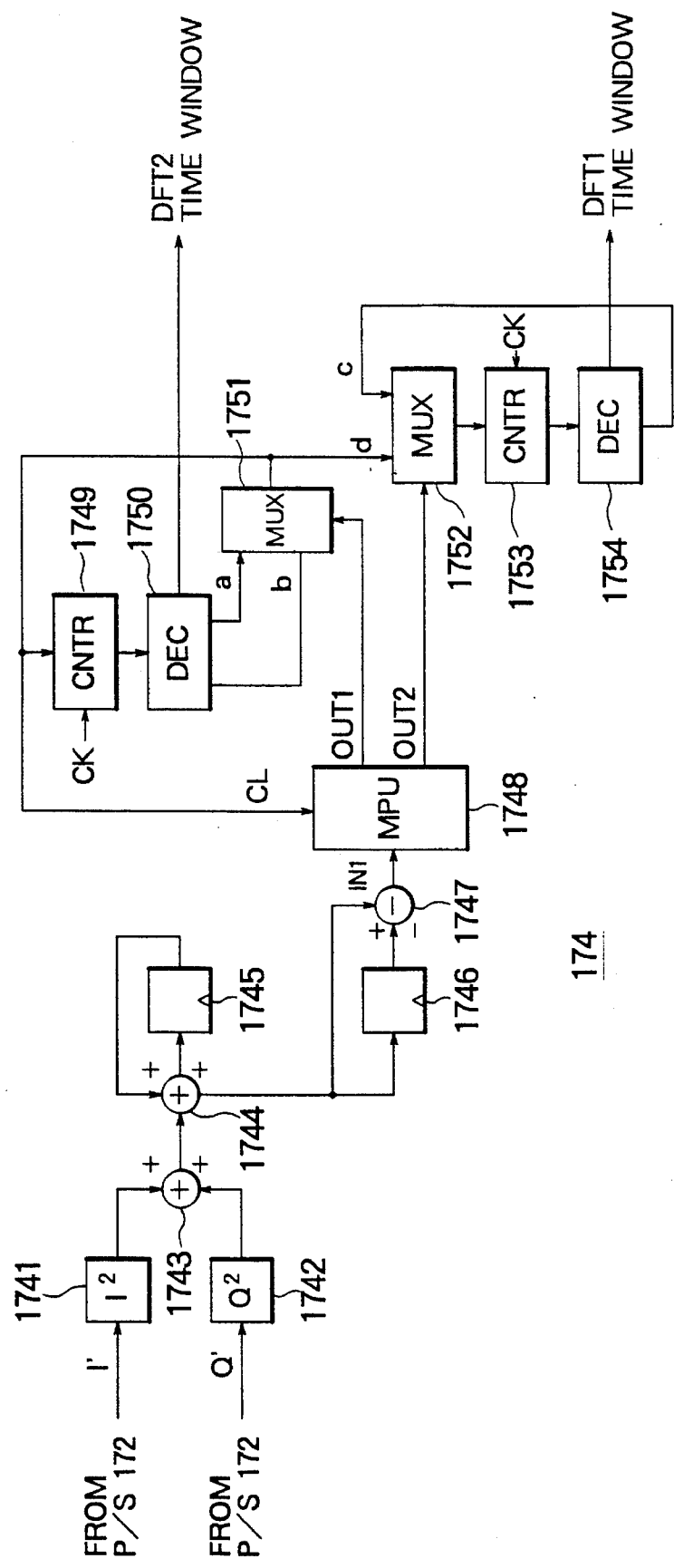
FIG. 13 is a view of the configuration of the time window signal generating circuit shown in FIG. 12.

FIG. 13 is a view of the configuration of the time window signal generating circuit 174 shown in FIG. 12. Note that the clocks signal CK is used for the operation of different portions of the time window signal generating circuit 174, but the connections of the clock signal CK are omitted for simplification of the illustration.

The doublers 1741 and 1742 square the I channel signal I' and the Q channel signal Q' applied from the P/S converters 172 and 173 to calculate the instantaneous energies. The adder 1743 calculates the sum of these instantaneous energies. The adder 1744 and the register 1745 together calculate the accumulated sum ΣD. The register 1746 and the subtractor 1747 together calculate the difference (deviation) between the previous accumulated sum ΣD and the current accumulated sum These circuit configurations are substantially the same as the doublers 1271 and 1272, the adder 1273, the adder 1274, the register 1275, the register 1276, and the subtractor 1277 in the DFT time window synchronization signal generating circuit 128 shown in FIG. 10.

The microprocessor 1748 generates the multiplexer selection signals OUT1 and OUT2 based on the change input from the subtractor 1747.

The counter 1749 counts the clock signals reproduced by the clock generating circuit 176. The decoder 1750 detects when the count has reached M and generates the second DFT time window signal DFT2 used in the second DFT circuit 171. That is, the counter 1749 and the decoder 1750 divide the clock signal CK to 1/M to generate the second DFT time window signal DFT2.

The counter 1753 counts the clock signals CK reproduced by the clock generating circuit 176. The decoder 1754 detects when the count reaches M and generates a first DFT time window signal DFT1 used in the first DFT circuit 121. That is, the counter 1753 and the decoder 1754 divide the clock signal CK to 1/M to generate the first DFT time window signal DFT1.

The multiplexer 1751 operates as a two-input, one-output selector. By the control of the microprocessor 1748 through the signal CL, it selects and outputs one of the two output signals a and b of the decoder 1750. The output of the multiplexer 1751 becomes the clear signal of the counter 1749. Further, the output of the multiplexer 1751 becomes the clear signal of the counter 1753 as well.

The multiplexer 1752 operates as two-input, one-output selector and selects and outputs one of the output signal c of the decoder 1754 and the output signal d of the multiplexer 1751 in accordance with the control of the selection signal OUT2.

An explanation will be given below of the operation of the time window generating circuit 174.

The results of transformation corresponding to the specific carrier wave signals of the serial format of the second DFT circuit 171, output from the P/S converters 172 and 173, are squared by the doublers 1741 and 1742. The accumulated value of the sums of the squares is calculated by the adder 1744 and the register 1745. The register 1745, however, is initialized (cleared) at the time of the start of the symbols of the OFDM modulated signal. Therefore, the accumulated value of the squares shows the strength of the specific frequency of the symbol unit. The accumulated value of one symbol's worth of the sum of the squares is stored in the register 1746. The change in the accumulated value of the squares in the symbol is calculated by the subtractor 1747.

The strength of the specific carrier wave signal and the phase deviation of the DFT time window signal have the relationship shown in FIG. 9. When the phase of the DFT time window signal is at the portion of the bottom of the accumulated sum ΣD, the DFT processing of the second DFT circuit 171 is performed without spanning two symbols, it is shown. When the phase of the time window signal is at the bottom of the accumulated sum ΣD, however, it is not known if the phase of the DFT time window signal is advanced or retarded.

Therefore, by comparing the accumulated value of the squares of the symbol just before stored in the register 1746 and the accumulated value of the squares of the current symbol, it is judged if the phase of the DFT time window signal is moving away from the appropriate phase or approaching the appropriate phase. That is, when the result of the subtraction of the subtractor 1747 is positive, it is judged that the phase of the DFT time window signal is moving away from the appropriate phase, while when the result of the subtraction of the subtractor 1747 is negative, it is judged that the phase of the DFT time window signal is approaching the appropriate phase.

When it is moving away from the appropriate phase, the phase of the DFT time window signal is shifted in the direction opposite to the direction of the phase shift at the previous symbol, while in the reverse case, the phase of the DFT time window signal is shifted in the direction of the phase shift at the previous symbol.

If the above-mentioned changes in direction of phase shift are merely repeated, however, the phase of the DFT time window signal will go back and forth between the two ends of the bottom of the accumulated sum ΣD to create a hunching state. In this state, it is possible to confirm the portion of the bottom of the accumulated sum ΣD of the squared values and by suitably fixing the phase of the DFT time window signal by the portion of the bottom of the accumulated sum ΣD, it is possible to achieve synchronization of the phase of the DFT time window signal without spanning two symbols.

However, in an actual system, there is noise and multiple path interference and other interference and the value of the accumulated sum ΣD does not always become 0. Further, these types of interference may give effects different instant by instant. Therefore, the portion of the bottom of the accumulated sum ΣD cannot be simply specified.

Therefore, processing of the microprocessor 1748 is used to evaluate the amount of change of the accumulated value of the squared values input from the subtractor 1747 and control the phase of the DFT time window signal. That is, the microprocessor 1748 performs processing based on the result of the subtraction of the subtractor 1747 which was input and produces the selection signals OUT1 and OUT2 for controlling the selection outputs of the multiplexers 1751 and 1752.

The selection signal OUT1 controls the second DFT generating circuit comprised of the counter 1749, the decoder 1750, and the multiplexer 1751.

In the same way, the selection signal OUT2 controls the first DFT generating circuit comprised of the counter 1753, the decoder 1754, and the multiplexer 1752.

In the second DFT generating circuit, the counter 1749 is set so as to count the clock signals CK in amounts of the (M+1) periods or (M−1) periods when one symbol has a length of M number of periods of the clock signals CK. As a result, the second DFT time window signal DFT2 is shifted in phase so that it is advanced or retarded in phase by exactly the amount of periods of one clock signal CK with each symbol.

The second DFT circuit 171 performs processing to select signals input from the P/S converters 122 and 123 based on the time window signal DFT2, so the time window signal is always matched to the phase giving the smallest strength of the DFT coefficient corresponding to a specific carrier wave signal.

In this way, the phase of the second DFT time window signal DFT2 drifts so as to constantly give the smallest accumulated sum ΣD when observing the change per symbol in the accumulated sum ΣD. The portion of the bottom of the accumulated sum ΣD is understood in the microprocessor 1748 from the operation of the second DFT generating circuit, so when it is judged that the phase of the second DFT time window signal DFT2 has been entered during this time, control is exercised on just that symbol by the control signal OUT2 so that the multiplexer 1752 selects the output of the multiplexer 1751.

At the initial stage, the microprocessor 1748 uses the selection signal OUT2 to set the multiplexer 1752 to select the output signal of the multiplexer 1751.

From the next symbol, the microprocessor 1748 sets things so that the output signal of the decoder 1754 is selected.

Here, the first DFT generating circuit is comprised so that when the count of the counter 1753 becomes (M−1), the decoder 1754 outputs the signal c and clears the counter 1753 through the multiplexer 1752. The first DFT generating circuit overall constitutes an M-base counter. That is, after the counter 1753 has been cleared once by the signal from the multiplexer 1751, the counter 1753 is always cleared by the signal from the decoder 1754, so the phase of the first DFT time window signal DFT1 is fixed.

The phase of the time window signal causes the phase of the second time window signal DFT2 to constantly change. The change in the accumulated sum ΣD is monitored by the microprocessor 1748. When the microprocessor 1748 judges that the phase of the time window signal DFT1 has deviated from the appropriate phase in accordance with the control routine shown in the flow chart of FIG. 14, it selects the output from the multiplexer 1751 through the selection signal OUT2.

The output signal d of the multiplexer 1751 is produced so as to clear the counter 1753 so as to shift the phase of the time window signal to the appropriate position in the above way, so the time window signal DFT1 is also matched with the appropriate phase at that time.

As explained above, the microprocessor 1748 monitors the state of the phase of the time window signal at all times using the second DFT circuit 171 and, on the other had, separate from this monitoring, the phase of the time window signal DFT1 is fixed and the DFT circuit 121 uses this time window signal DFT1 to demodulate the OFDM modulated signal. Accordingly, it is possible to stably demodulate without normally changing the phase of the time window signal DFT1 to the DFT circuit 121 so as to monitor the phase state of the time window signal and, further, it is possible to stably perform correction of the amplitude and phase of the demodulated output.

Further, the monitoring of the phase state of the DFT time window signal is performed exclusively by the second DFT circuit 171, so even if a change occurs in the state of the transmission path and the phase of the DFT time window signal must be retaken, it is possible to quickly detect the change in state and deal with the same.

A detailed explanation will be given below of the processing for monitoring the state of the DFT time window signal in the microprocessor 1748 mentioned above.

Figure 14:
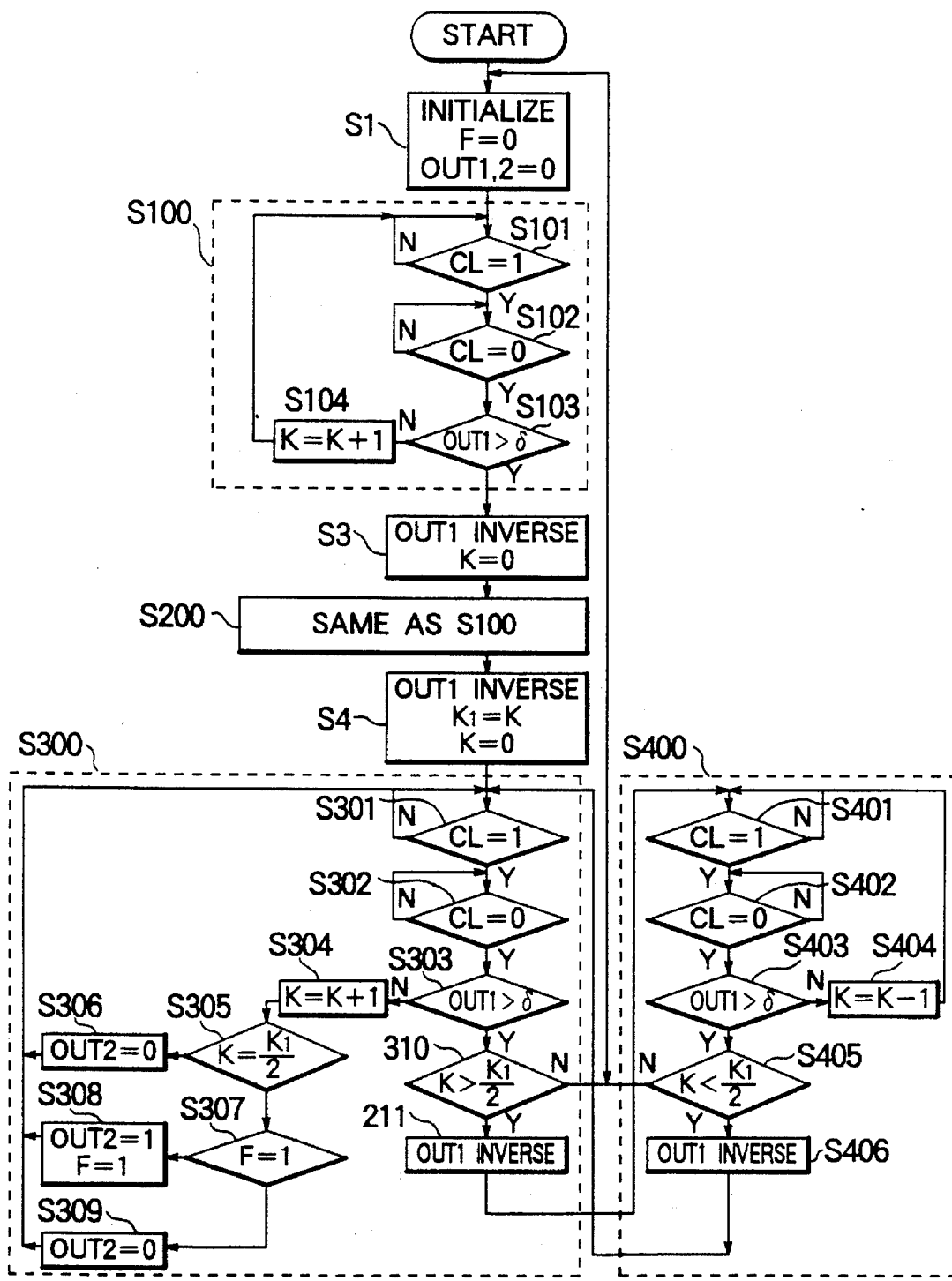
FIG. 14 is a flow chart of the content of the processing for monitoring the phase state of the DFT time window signal in the microprocessor shown in FIG. 13.

FIG. 14 is a flow chart of the processing for monitoring the phase state of the DFT time window signal in the microprocessor 1748.

At step 1 (S1), the microprocessor 1748 clears the flag F (to 0) as the initial setting and makes the selection signal OUT1 and the selection signal OUT2 0. The selection signal OUT1 controls the signal selection of the multiplexer 1751. When the selection signal OUT1 is 0, the multiplexer 1751 selects the output a so the decoder 1750 clears the counter 1749 at the count (M−2) of the counter 1749, while when the selection signal OUT2 is 1, it selects the output b so the decoder 1750 clears the counter 1749 at the count M of the counter 1749. Further, the selection signal OUT2 controls the signal selection of the multiplexer 1752. When the selection signal OUT2 is 0, the counter 1753 selects the output signal of the decoder 1754, while when the selection signal OUT2 is 1, it selects the output signal of the multiplexer 1751.

At step 100 (S100), the processing of step 101 to step 104 is performed.

At step 101 (S101), the microprocessor 1748 judges the output signal CL of the microprocessor 1751. When the signal CL is the logical value 1, it proceeds to the processing of step 102, while when it is the logical value 0, it proceeds to the processing of step 101.

At step 102 (S102), the microprocessor 1748 judges the output signal CL of the multiplexer 1751. When it the signal CL is the logical value 0, it proceeds to the processing of step 103, while when it is 1, it stops at the processing of step 101.

By the processing of step 101 and step 102, the microprocessor 1748 proceeds to the processing of step 103 on with each period of the signal CL and evaluates the value of the output signal IN1 from the subtractor 1747. The signal IN1 is the difference between symbols of the accumulated sum ΣD of the square values from the subtractor 1747. It is negative when controlled in a direction decreasing the accumulated sum ΣD in the graph of the phase error Δϕ of the DFT time window signal and accumulated sum ΣD shown in FIG. 9. Further, it becomes 0 when at the bottom portion, but becomes a positive value when controlled in a direction increasing the accumulated sum ΣD. In an actual system, however, there is noise and various interference in the transmission and the effects of the same have to be considered.

At step 103 (S103), the microprocessor 1748 compares the predetermined positive value threshold value δ and the signal IN1. If the signal IN is larger than the threshold value δ, the routine proceeds to the processing of step 3, while if it is smaller, the routine proceeds to the processing of step 104.

At step 104 (S104), the value K of the counter in the microprocessor 174 is incremented by exactly 1 to make K+1. If in a state where the phase of the time window signal decreases the accumulated sum ΣD or if it is at the portion of the bottom of the accumulated sum ΣD, the processing of step 104 is executed. Other than these cases, that is, when the phase of the time window signal increases the accumulated sum ΣD, the routine proceeds to the processing of step 3.

In the processing of step 100 mentioned above, the end of the portion of the bottom of the accumulated sum ΣD shown in FIG. 9 is searched for.

At step 3 (S3), the microprocessor 1748 inverts the selection signal OUT1 and makes the value K of the counter 0. The significance of the processing at step 3 is that after the end of the bottom of the accumulated sum ΣD of FIG. 11 is searched for by the processing of step 100, the signal OUT1 is inverted and the direction of phase shift of the time window signal DFT2 is inverted and the value K of the counter cleared.

The value K of the counter expresses the width of the accumulated sum ΣD in units of symbol periods.

At step 200 (S200), similar processing is performed as in step 100 to find the other end of the accumulated sum ΣD of FIG. 9.

In the processing of step 100 and step 200, it is possible to measure the magnitude of the portion of the bottom of the accumulated sum ΣD as the value K of the counter.

That is, the value of K at the processing of step 200 may be considered to be the magnitude of the portion of the bottom of the accumulated sum ΣD.

At step 4 (S4), the polarity of the signal OUT1 is inverted, the magnitude of the bottom of the accumulated sum ΣD measured in the processing of step 200 is stored in the K1 register of the microprocessor, and the value K of the counter is cleared.

At step 300 (S300), the phase of the time window signal DFT1 is controlled, By the processing of step the phase of the time window signal DFT2 is at one of the ends of the bottom of the accumulated sum ΣD of FIG. 9. The phase of the time window signal is shifted from this end one clock CK at a time every symbol toward the other end of the accumulated sum ΣD. Accordingly, the phase of the time window signal DFT1 is matched to the magnitude of the bottom of the accumulated sum ΣD measured by the processing of step 200, that is, the position of half of the value K of the counter.

At step 301 (S301) and step 302 (S302), in the same way as the processings at step 101 and step 102, the microprocessor 1748 proceeds to the processing of step 303 on with each cycle of the signal CL and evaluates the value of the signal IN1 of the time window signal DFT2.

At step 303 (S303), the microprocessor 1748 evaluates the magnitude of the signal IN1 and when the value of the signal IN1 is smaller than the threshold value δ, considers that the phase of the time window signal is at the portion of the bottom of the accumulated sum ΣD of FIG. 9 and proceeds to the processing of step 304. When the value of the signal IN1 is larger than the threshold value δ, it proceeds to the processing of step 310.

At step 304 (S304), the microprocessor 1748 increases the value K of the counter by exactly 1.

At step 305 (S305), the microprocessor 1748 judges if the value K of the counter is half of the value of the magnitude of the accumulated sum ΣD measured in the processing at step 200 and stored in the register K1. If not half, it proceeds to the processing of step 306, while if half, it proceeds to the processing of step 307.

At step 307 (S306), the microprocessor 1748 makes the value of the selection signal OUT2 0.

At steps 307 to 309 (S307 to S309), the microprocessor 1748 evaluates the value of the flag F. If the flag F is 0, it makes the signal OUT2 1 (S308), so as to set the multiplexer 1752 in FIG. 13 to select the input signal from the multiplexer 1751 and set the flag F to 1. When the flag F is 1, it makes the selection signal OUT2 0 and stops the phase shift of the time window signal DFT1 (S309).

At step 310 (S310), the microprocessor 1748 monitors the changes in state of the transmission path and if detecting a change in state returns to the initial state, that is, the processing of step 1.

The reason for this processing will now be explained. In the processing of step 303, the magnitude of the signal IN1 is evaluated. At this time, the phase of the time window signal DFT2 shifts from one end of the bottom of the accumulated sum ΣD of FIG. 9 toward the other end and it is judged if the other end has been found. If the other end has been found, the normally, only naturally, a value near the magnitude of the bottom of the accumulated sum ΣD measured in the processing of step 200 should be taken and the value of the counter at that time should be larger than one-half of K1. If the state of the transmission path changes at that time, however, and the phase state of the time window signal becomes improper, the value K of the counter becomes smaller than one-half of the value stored in the register K1. Accordingly, the change in the state of the transmission path is detected by the value K of the counter and when there is a change the routine proceeds to the processing of step 1. When there is no change, the routine proceeds to the processing of step 311.

At step 311 (S311), the microprocessor 1748 reverses the logic of the selection signal OUT1.

At step 400 (S400), the microprocessor 1748 receives the inversion of the direction of the phase shift of the time window signal DFT2 in the processing of step 300 and monitors the change of state of the transmission path by the direction of the phase shift of the time window signal DFT2.

In step 401 (S401) to step 402 (S402), in the same way as the processing at step 101 and step 102 mentioned above, the microprocessor 1748 proceeds to the processing of step 403 on at each cycle of the signal CL and evaluates the value of the signal IN1 of the time window signal DFT2.

At step 403 (S403), the microprocessor 1748 compares the magnitude of the signal IN1 and the threshold value δ. When the value of the signal IN1 is smaller than the threshold value δ, the count K is decremented by exactly 1 (S404) while the selection signal OUT1 is larger than the threshold value δ, it is judged that this is the end of the bottom of the accumulated sum ΣD of FIG. 9 and the routine proceeds to the processing of step S405.

At step 405 (S405), the microprocessor 1748 monitors the change in state of the transmission path in the same way as the processing of step 310. That is, if the count K at that time is normal, it should be smaller than one-half of the value stored in the register K1. In this case, the polarity of the selection signal OUT1 is inverted so as to reverse the direction of the phase shift of the time window signal DFT2 (S406). On the other hand, when the count K is larger than one-half of K1 at the processing of step 405, it can be judged that the state of the transmission path has changed. Accordingly, in this case, the initial state, that is, the processing of step 1, is returned to and the synchronization pull-in operation of the phase of the DFT time window signal is started once again from the beginning.

The processing of the microprocessor 1748 usually consists of a loop of the processing of step 100, step 200, step 300, and step 400. When the state of the transmission path changes, however the change is detected by the processing at step 310 or step 405 and the initial state (S1) is returned to.

The time window signal generating circuit 174 is controlled by the above processing of the microprocessor 1748.

As explained above, according to the digital demodulation apparatus of the present invention, provision is made of a circuit exclusively for monitoring the phase of the DFT time window signal and this circuit is used to generate a DFT time window signal for demodulation of the OFDM modulated signal, so it is possible to monitor the state of synchronization of the time window signal at all times.

Further, since the phase of the DFT time window signal fop performing the demodulation of the OFDM modulated signal can be held optimal at all times, a stable DFT time window synchronization can be obtained and changes in the transmission path can be quickly coped with.

The digital modulation apparatus and the digital demodulation apparatus of the present invention are not limited to the above-mentioned embodiments and may be modified in various ways.

For example, the IDFT circuit 303 shown in FIG. 5 was shown with reference to the example of performing the processing on the I channel signal and Q channel signal by a single IDFT circuit, but it is also possible to perform the processing on the I channel signal and the Q channel signal by different IDFT circuits. Similarly, the DFT circuit 121 shown in FIG. 7 and the second DFT circuit 171 shown in FIG. 12 may be realized by two independent DFT circuits. The advantages of separating the IDFT circuits or the DFT circuits into two systems in this way are that high speed signal processing is made possible and, further, conversely, the above-mentioned processing may be performed by DFT circuits or IDFT circuits having relatively low operating speeds.

Note that various proposals have been made for algorithms for higher speed DFT and algorithms for higher speed IDFT, but the present invention can use all of these algorithms to perform IDFT or DFT, so no allusion is made to the algorithms themselves.

What is claimed is:

1. An orthogonal frequency division multiplex (OFDM) demodulation apparatus for demodulating an OFDM modulated signal which is comprised of a first component signal including a synchronization symbol and a second component signal including a synchronization symbol in an orthogonal relationship with the first component signal, which component signals are multiplexed by orthogonal frequency division, which OFDM demodulation apparatus comprises:

first signal extracting means for extracting a first component signal from the OFDM modulated signal, second signal extracting means for extracting a second component signal from the OFDM modulated signal, clock reproduction means for reproducing a clock signal using the first component signal and the second component signal, first DFT means for performing DFT on the extracted first component signal using a first time window signal to generate a first frequency region component signal, second DFT means for performing DFT on the extracted second component signal using said first time window signal to generate a second frequency region component signal, and time window synchronization signal generating means including basic time window signal means for dividing in frequency the reproduced clock signal and generating a basic time window signal, phase adjusting means for detecting the timing in which the synchronization symbol is present using the first frequency region component signal and the second frequency region component signal and for adjusting the phase of the basic time window signal, and synchronization pull-in means for performing synchronization pull-in of the basic time window signal to the phase of the synchronization symbol using the first frequency region component signal and the second frequency region component signal, the basic time window signal subjected to the synchronization pull-in and phase adjustment being applied to the first DFT means and the second DFT means as said first time window signal.

2. A demodulation apparatus as set forth in claim 1, wherein the first signal extracting means detects the timings in which the synchronization symbol included in the first frequency region component signal and second frequency region component region is present and extracts the first component signal from the OFDM modulated signal based on a first carrier wave signal having the oscillation frequency defined based on the timing and the second signal extracting means detects the timing in which the synchronization symbol included in the first frequency region component signal and second frequency region component region is present and extracts the second component signal from the OFDM modulated signal based on a second carrier wave signal having the oscillation frequency defined based on the timing and in an orthogonal relationship with the first carrier wave signal.

3. A demodulation apparatus as set forth in claim 1, wherein the phase adjusting means of the time window synchronization signal generating means detects the timing in which the synchronization symbol included in the first component signal and the second component signal is present using the combined energy of the sum of the energy component of the first frequency region component signal and the energy component of the second frequency region component signal and adjusts the phase of the basic time window signal accordingly.

4. A demodulation apparatus as set forth in claim 3, wherein the value of the synchronization symbol is 0.

5. A demodulation apparatus as set forth in claim 1, wherein the synchronization pull-in means of the time window synchronization signal generating means performs synchronization pull-in so that the cumulative sum of the combined energy of the sum of the energy component of the first frequency region component signal and the energy component of the second frequency region component signal becomes the minimum.

6. A demodulation apparatus as set forth in claim 1, wherein a guard interval is included in the first component signal and the second component signal and provision is made of a first guard interval removing means for removing the guard interval from the first frequency region component signal from the first DFT means and a second guard interval removing means for removing the guard interval from the second frequency region component signal output from the second DFT means.

7. A demodulation apparatus as set forth in claim 1, wherein the first frequency region component signal is an in-phase signal component and the second frequency region component signal is a quadrature signal component.

8. An orthogonal frequency division multiplex (OFDM) demodulation apparatus for demodulating an OFDM modulated signal which is comprised of a first component signal including a synchronization symbol and a second component signal including a synchronization symbol in an orthogonal relationship with the first component signal, which component signals are multiplexed by orthogonal frequency division, said OFDM demodulation apparatus comprising:

first signal extracting means for extracting a first component signal from the OFDM modulated signal, second signal extracting means for extracting a second component signal from the OFDM modulated signal, clock reproduction means for reproducing a clock signal using the first component signal and the second component signal, first DFT means for performing DFT on the extracted first component signal using a first time window signal to generate as an output a first frequency region component signal, second DFT means for performing DFT on the extracted second component signal using said first time window signal to generate as an output a second frequency region component signal, third DFT means for performing DFT on the extracted first component signal using a second time window signal to generate a third frequency region component signal, fourth DFT means for performing DFT on the extracted second component signal using the second time window signal to generate a fourth frequency region component signal, first time window synchronization signal generating means including first basic time window signal means for dividing in frequency the reproduced clock signal and generating a first basic time window signal, first phase adjusting means for detecting the timing in which the synchronization symbol is present using the third frequency region component signal and the fourth frequency region component signal and adjusting the phase of the first basic time window signal, and first synchronization pull-in means for performing synchronization pull-in of the first basic time window signal to the phase of the synchronization symbol using the third frequency region component signal and the fourth frequency region component signal, the first basic time window signal subjected to the synchronization pull-in and phase adjustment being applied to the first DFT means and the second DFT means as said first time window signal, and second time window synchronization signal generating means including second basic time window signal means for dividing in frequency the reproduced clock signal and generating a second basic time window signal, second phase adjusting means for detecting the timing in which the synchronization symbol is present using the third frequency region component signal and the fourth frequency region component signal and adjusting the phase of the first basic time window signal, and second synchronization pull-in means for performing synchronization pull-in of the second basic time window signal to the phase of the synchronization symbol using the third frequency region component signal and the fourth frequency region component signal, the second basic time window signal subjected to the synchronization pull-in and phase adjustment being applied to the third DFT means and the fourth DFT means as said second time window signal.

9. A demodulation apparatus as set forth in claim 8, wherein the first signal extracting means detects the timing in which the synchronization symbol included in the first frequency region component signal and second frequency region component region is present and extracts the first component signal from the OFDM modulated signal based on a first carrier wave signal having the oscillation frequency defined based on the timing and the second signal extracting means detects the timing in which the synchronization symbol included in the first frequency region component signal and second frequency region component region is present and extracts the second component signal from the OFDM modulated signal based on a second carrier wave signal having the oscillation frequency defined based on the timing and in an orthogonal relationship with the first carrier wave signal.

10. A demodulation apparatus as set forth in claim 8, wherein the phase adjusting means of the first time window synchronization signal generating means detects the timing in which the synchronization symbol included in the first component signal and the second component signal is present using the combined energy of the sum of the energy component of the third frequency region component signal and the energy component of the fourth frequency region component signal and adjusts the phase of the first basic time window signal accordingly.

11. A demodulation apparatus as set forth in claim 8, wherein the phase adjusting means of the second time window synchronization signal generating means detects the timing in which the synchronization symbol included in the first component signal and the second component signal is present using the combined energy of the sum of the energy component of the third frequency region component signal and the energy component of the fourth frequency region component signal and adjusts the phase of the second basic time window signal accordingly.

12. A demodulation apparatus as set forth in claim 10, wherein the value of the synchronization symbol is 0.

13. A demodulation apparatus as set forth in claim 10, wherein the synchronization pull-in means of the first time window synchronization signal generating means performs synchronization pull-in so that the cumulative sum of the combined energy of the sum of the energy component of the third frequency region component signal and the energy component of the fourth frequency region component signal becomes the minimum.

14. A demodulation apparatus as set forth in claim 11, wherein the synchronization pull-in means of the first time window synchronization signal generating means performs synchronization pull-in so that the cumulative sum of the combined energy of the sum of the energy component of the third frequency region component signal and the energy component of the fourth frequency region component signal becomes the minimum.

15. A demodulation apparatus as set forth in claim 8, wherein a guard interval is included in the first component signal and the second component signal and provision is made of a first guard interval removing means for removing the guard interval from the first frequency region component signal from the first DFT means and a second guard interval removing means for removing the guard interval from the second frequency region component signal output from the second DFT means.

16. A demodulation apparatus as set forth in claim 8, wherein the first frequency region component signal is an in-phase signal component and the second frequency region component signal is a quadrature signal component.

* * * * *